(12) United States Patent
Fuchikami

(10) Patent No.: US 11,356,589 B2
(45) Date of Patent: Jun. 7, 2022

(54) VIDEO DISPLAY SYSTEM AND VIDEO DISPLAY METHOD

(71) Applicant: Panasonic Intellectual Property Management Co., Ltd., Osaka (JP)

(72) Inventor: Ryuji Fuchikami, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/968,803

(22) PCT Filed: Jan. 30, 2019

(86) PCT No.: PCT/JP2019/003045
§ 371 (c)(1),
(2) Date: Aug. 10, 2020

(87) PCT Pub. No.: WO2019/167521
PCT Pub. Date: Sep. 6, 2019

(65) Prior Publication Data
US 2020/0404136 A1     Dec. 24, 2020

(30) Foreign Application Priority Data
Feb. 28, 2018   (JP) .............................. JP2018-034503

(51) Int. Cl.
*H04N 5/232*     (2006.01)
*G09G 5/00*      (2006.01)
*G09G 5/36*      (2006.01)
*H04N 7/18*      (2006.01)

(52) U.S. Cl.
CPC .............. *H04N 5/232* (2013.01); *G09G 5/006* (2013.01); *G09G 5/36* (2013.01); *H04N 7/18* (2013.01)

(58) Field of Classification Search
CPC .......... G09G 5/397; G09G 5/391; G09G 5/36; G09G 2320/103; G09G 2320/0686;
(Continued)

(56) References Cited

U.S. PATENT DOCUMENTS

| 6,028,589 A * | 2/2000 | Mehra ..................... H04N 7/012 345/603 |
| 7,305,114 B2 * | 12/2007 | Wolff ................... G06K 9/6253 348/113 |

(Continued)

FOREIGN PATENT DOCUMENTS

JP   2008-219484   9/2008

OTHER PUBLICATIONS

International Search Report issued in International Patent Application No. PCT/JP2019/003045, dated May 7, 2019, along with an English translation thereof.

*Primary Examiner* — Vinh T Lam
(74) *Attorney, Agent, or Firm* — Greenblum & Bernstein, P.L.C.

(57) ABSTRACT

Video display system is configured to include imaging device that sequentially outputs display video data of a second gradation having a second bit number smaller than a first bit number, based on captured video data of the first gradation having the first bit number, and display apparatus that sequentially displays a video based on the display video data from imaging device, and in display apparatus, when a plurality of frames continuous in time series are displayed based on the display video data, although a first gradation value based on the first gradation of a predetermined pixel included in the captured video data corresponding to the plurality of frames does not change in imaging device, a second gradation value based on the second gradation of the (Continued)

predetermined pixel included in the display video data corresponding to the plurality of frames varies.

12 Claims, 14 Drawing Sheets

(58) Field of Classification Search
CPC ........... G09G 5/006; G09G 2340/0428; G09G 2320/0252; H04N 5/23293; H04N 5/232; H04N 7/183; H04N 5/2322; H04N 7/18
See application file for complete search history.

(56) References Cited

U.S. PATENT DOCUMENTS

| | | | |
|---|---|---|---|
| 8,406,309 B2* | 3/2013 | Lee | H04N 19/115 375/240.26 |
| 8,421,809 B2* | 4/2013 | Sumi | G09G 3/2011 345/533 |
| 8,912,999 B2* | 12/2014 | Plut | G09G 3/20 345/102 |
| 9,135,884 B2* | 9/2015 | Plut | G06F 1/3218 |
| 9,811,946 B1* | 11/2017 | Hung | G06T 3/4038 |
| 10,027,883 B1* | 7/2018 | Kuo | H04N 5/23293 |
| 10,410,567 B2* | 9/2019 | Nakagoshi | G09G 3/001 |
| 2002/0061064 A1* | 5/2002 | Ishikawa | H04N 19/17 348/E7.086 |
| 2011/0060831 A1* | 3/2011 | Ishii | H04L 43/12 709/224 |
| 2013/0093922 A1* | 4/2013 | Mowry | G03B 35/00 348/239 |
| 2016/0057319 A1* | 2/2016 | Tokumura | H04N 5/7416 348/607 |
| 2018/0061290 A1* | 3/2018 | Kwon | G09G 3/2059 |

* cited by examiner

FIG. 3

| TIME | \multicolumn{2}{c|}{0} | \multicolumn{2}{c|}{1} | \multicolumn{2}{c|}{2} | \multicolumn{2}{c|}{3} | ... | \multicolumn{2}{c|}{10} | \multicolumn{2}{c|}{11} | \multicolumn{2}{c|}{12} | ... | \multicolumn{2}{c|}{238} | \multicolumn{2}{c|}{239} | \multicolumn{2}{c|}{240} |
|---|---|---|---|---|---|---|---|---|---|---|---|---|---|---|---|---|---|---|---|---|---|
|  | OUTPUT | INTEGRAL VALUE | OUTPUT | INTEGRAL VALUE | OUTPUT | INTEGRAL VALUE | OUTPUT | INTEGRAL VALUE |  | OUTPUT | INTEGRAL VALUE | OUTPUT | INTEGRAL VALUE | OUTPUT | INTEGRAL VALUE |  | OUTPUT | INTEGRAL VALUE | OUTPUT | INTEGRAL VALUE | OUTPUT | INTEGRAL VALUE |
| INITIAL VALUE | 0 | 0 | 0 | 0 | 0 | 0 | 0 | 0 |  | 0 | 0 | 0 | 0 | 0 | 0 |  | 14 | 0 | 14 | 0 | 15 | 0 |
| t0 | 0 | 0 | 0 | 1 | 0 | 2 | 0 | 3 |  | 0 | 10 | 0 | 11 | 0 | 12 |  | 14 | 14 | 14 | 15 | 15 | 15 |
| t1 | 0 | 0 | 0 | 2 | 0 | 4 | 0 | 6 |  | 1 | 20 | 1 | 22 | 1 | 24 |  | 15 | 28 | 15 | 30 | 15 | 15 |
| t2 | 0 | 0 | 0 | 3 | 0 | 6 | 0 | 9 |  | 1 | 14 | 2 | 17 | 2 | 20 |  | 16 | 26 | 16 | 29 | 15 | 15 |
| t3 | 0 | 0 | 0 | 4 | 0 | 8 | 0 | 12 |  | 1 | 8 | 1 | -4 | 2 | 0 |  | 16 | 8 | 16 | 12 | 15 | 15 |
| t4 | 0 | 0 | 0 | 5 | 0 | 10 | 0 | 15 |  | 1 | 2 | 0 | -9 | 0 | -20 |  | 15 | -10 | 15 | -5 | 15 | 15 |
| t5 | 0 | 0 | 0 | 6 | 0 | 12 | 1 | 18 |  | 0 | -4 | 0 | 2 | -1 | -8 |  | 14 | -12 | 14 | -6 | 15 | 15 |
| t6 | 0 | 0 | 0 | 7 | 0 | 14 | 1 | 5 |  | 0 | 6 | 0 | 13 | 0 | 20 |  | 14 | 2 | 14 | 9 | 15 | 15 |
| t7 | 0 | 0 | 0 | 8 | 1 | 16 | 0 | -8 |  | 1 | 16 | 1 | 24 | 2 | 32 |  | 15 | 16 | 15 | 24 | 15 | 15 |
| t8 | 0 | 0 | 0 | 9 | 1 | 2 | -1 | -5 |  | 1 | 10 | 2 | 19 | 2 | 12 |  | 15 | 14 | 16 | 23 | 15 | 15 |
| t9 | 0 | 0 | 0 | 10 | 0 | -12 | -1 | 14 |  | 1 | 4 | 1 | -2 | 1 | -8 |  | 15 | 12 | 16 | 6 | 15 | 15 |
| t10 | 0 | 0 | 0 | 11 | -1 | -10 | 1 | 33 |  | 0 | -2 | 0 | -7 | 0 | -12 |  | 15 | 10 | 15 | -11 | 15 | 15 |
| t11 | 0 | 0 | 0 | 12 | -1 | 8 | 2 | 20 |  | 0 | 8 | 0 | 4 | 0 | 0 |  | 15 | 8 | 14 | -12 | 15 | 15 |
| t12 | 0 | 0 | 0 | 13 | 0 | 26 | 1 | -9 |  | 1 | 18 | 0 | 15 | 0 | 12 |  | 15 | 6 | 14 | 3 | 15 | 15 |
| t13 | 0 | 0 | 0 | 14 | 1 | 28 | -1 | -22 |  | 1 | 12 | 1 | 26 | 1 | 24 |  | 15 | 4 | 15 | 18 | 15 | 15 |
| t14 | 0 | 0 | 0 | 15 | 1 | 14 | -2 | -3 |  | 1 | 6 | 2 | 21 | 2 | 20 |  | 15 | 2 | 16 | 17 | 15 | 15 |
| t15 | 0 | 0 | 1 | 16 | 1 | 0 | 0 | 32 |  | 1 | 0 | 2 | 0 | 2 | 0 |  | 15 | 0 | 16 | 0 | 15 | 0 |
| 16 TIMES OF AVERAGE VALUE (INVERSE QUANTIZING) | \multicolumn{2}{c|}{0} | \multicolumn{2}{c|}{0} | \multicolumn{2}{c|}{2} | \multicolumn{2}{c|}{1} |  | \multicolumn{2}{c|}{10} | \multicolumn{2}{c|}{11} | \multicolumn{2}{c|}{12} |  | \multicolumn{2}{c|}{238} | \multicolumn{2}{c|}{239} | \multicolumn{2}{c|}{240} |

GRADATION VALUE OF VIDEO DATA

FIG. 6

| FRAME No. | GRADATION VALUE OF VIDEO DATA | INTEGRAL VALUE | OUTPUT VALUE OF IMAGING DEVICE | LUMINANCE VALUE OF HIGH-SPEED DISPLAY APPARATUS |
|---|---|---|---|---|
| 0 | 0 | 0 | 0 | 0 |
| 1 | 8 | 0 | 7 | 7 |
| 2 | 9 | 7 | 2 | 9 |
| 3 | 10 | 9 | 1 | 10 |
| 4 | 12 | 10 | 2 | 12 |
| 5 | 14 | 12 | 2 | 14 |
| 6 | 17 | 14 | 3 | 17 |
| 7 | 20 | 17 | 3 | 20 |
| 8 | 24 | 20 | 4 | 24 |
| 9 | 28 | 24 | 4 | 28 |
| 10 | 33 | 28 | 5 | 33 |
| ⋮ | ⋮ | ⋮ | ⋮ | ⋮ |
| 40 | 234 | 230 | 4 | 234 |
| 41 | 238 | 234 | 4 | 238 |
| 42 | 241 | 238 | 3 | 241 |
| 43 | 243 | 241 | 2 | 243 |
| 44 | 245 | 243 | 2 | 245 |
| 45 | 246 | 245 | 1 | 246 |
| 46 | 247 | 246 | 1 | 247 |
| 47 | 247 | 247 | 0 | 247 |
| 48 | 247 | 247 | 0 | 247 |
| 49 | 247 | 247 | 0 | 247 |
| 50 | 245 | 247 | -2 | 245 |
| 51 | 244 | 245 | -1 | 244 |
| 52 | 241 | 244 | -3 | 241 |
| 53 | 238 | 241 | -3 | 238 |
| 54 | 235 | 238 | -3 | 235 |
| 55 | 231 | 235 | -4 | 231 |
| 56 | 227 | 231 | -4 | 227 |
| 57 | 222 | 227 | -5 | 222 |
| 58 | 217 | 222 | -5 | 217 |
| 59 | 212 | 217 | -5 | 212 |
| 60 | 206 | 212 | -6 | 206 |
| ⋮ | ⋮ | ⋮ | ⋮ | ⋮ |
| 180 | 26 | 31 | -5 | 26 |
| 181 | 22 | 26 | -4 | 22 |
| 182 | 19 | 22 | -3 | 19 |
| 183 | 15 | 19 | -4 | 15 |
| 184 | 13 | 15 | -2 | 13 |
| 185 | 11 | 13 | -2 | 11 |
| 186 | 9 | 11 | -2 | 9 |
| 187 | 8 | 9 | -1 | 8 |
| 188 | 8 | 8 | 0 | 8 |
| 189 | 8 | 8 | 0 | 8 |
| 190 | 8 | 8 | 0 | 8 |
| 191 | 9 | 8 | 1 | 9 |
| 192 | 11 | 9 | 2 | 11 |
| 193 | 13 | 11 | 2 | 13 |
| 194 | 15 | 13 | 2 | 15 |
| 195 | 19 | 15 | 4 | 19 |
| 196 | 22 | 19 | 3 | 22 |
| 197 | 26 | 22 | 4 | 26 |
| 198 | 31 | 26 | 5 | 31 |
| 199 | 36 | 31 | 5 | 36 |
| 200 | 41 | 36 | 5 | 41 |
| ⋮ | ⋮ | ⋮ | ⋮ | ⋮ |

FIG. 8

| FRAME No. | GRADATION VALUE OF VIDEO DATA | INTEGRAL VALUE | OUTPUT VALUE OF VIDEO DEVICE | LUMINANCE VALUE OF HIGH-SPEED DISPLAY APPARATUS |
|---|---|---|---|---|
| 0 | 0 | 0 | 0 | 0 |
| 1 | 8 | 0 | 1 | 1 |
| 2 | 8 | 1 | 1 | 2 |
| 3 | 8 | 2 | 1 | 3 |
| 4 | 8 | 3 | 1 | 4 |
| 5 | 8 | 4 | 1 | 5 |
| 6 | 8 | 5 | 1 | 6 |
| 7 | 8 | 6 | 1 | 7 |
| 8 | 8 | 7 | 1 | 8 |
| 9 | 8 | 8 | 1 | 9 |
| 10 | 8 | 9 | 1 | 10 |
| 11 | 8 | 10 | -1 | 9 |
| 12 | 8 | 9 | -1 | 8 |
| 13 | 8 | 8 | -1 | 7 |
| 14 | 8 | 7 | 1 | 8 |
| 15 | 8 | 8 | 1 | 9 |
| 16 | 8 | 9 | 1 | 10 |
| ⋮ | ⋮ | ⋮ | ⋮ | ⋮ |
| 273 | 103 | 104 | 1 | 105 |
| 274 | 104 | 105 | 1 | 106 |
| 275 | 104 | 106 | -1 | 105 |
| 276 | 105 | 105 | -1 | 104 |
| 277 | 105 | 104 | 1 | 105 |
| 278 | 106 | 105 | 1 | 106 |
| 279 | 107 | 106 | 1 | 107 |
| 280 | 107 | 107 | 1 | 108 |
| 281 | 108 | 108 | 1 | 109 |
| 282 | 108 | 109 | 1 | 110 |
| ⋮ | ⋮ | ⋮ | ⋮ | ⋮ |
| 600 | 246 | 247 | 1 | 248 |
| 601 | 246 | 248 | -1 | 247 |
| 602 | 246 | 247 | -1 | 246 |
| 603 | 247 | 246 | 1 | 247 |
| 604 | 247 | 247 | 1 | 248 |
| 605 | 247 | 248 | 1 | 249 |
| 606 | 247 | 249 | -1 | 248 |
| 607 | 247 | 248 | -1 | 247 |
| 608 | 247 | 247 | -1 | 246 |
| 609 | 247 | 246 | 1 | 247 |
| 610 | 247 | 247 | 1 | 248 |
| ⋮ | ⋮ | ⋮ | ⋮ | ⋮ |
| 992 | 98 | 99 | 1 | 100 |
| 993 | 98 | 100 | -1 | 99 |
| 994 | 97 | 99 | -1 | 98 |
| 995 | 96 | 98 | -1 | 97 |
| 996 | 96 | 97 | -1 | 96 |
| 997 | 95 | 96 | -1 | 95 |
| 998 | 95 | 95 | -1 | 94 |
| 999 | 94 | 94 | -1 | 93 |
| 1000 | 93 | 93 | -1 | 92 |

FIG. 12

| FRAME No. | GRADATION VALUE OF VIDEO DATA | INTEGRAL VALUE | DIFFERENCE | OUTPUT VALUE OF VIDEO DEVICE | INVERSELY QUANTIZED VALUE | LUMINANCE VALUE OF HIGH-SPEED DISPLAY APPARATUS |
|---|---|---|---|---|---|---|
| 0 | 0 | 0 | 0 | 0 | 0 | 0 |
| 1 | 10 | 0 | 10 | 3 | 8 | 8 |
| 2 | 17 | 8 | 9 | 3 | 8 | 16 |
| 3 | 28 | 16 | 12 | 3 | 8 | 24 |
| 4 | 44 | 24 | 20 | 4 | 16 | 40 |
| 5 | 63 | 40 | 23 | 4 | 16 | 56 |
| 6 | 84 | 56 | 28 | 4 | 16 | 72 |
| 7 | 107 | 72 | 35 | 5 | 32 | 104 |
| 8 | 131 | 104 | 27 | 4 | 16 | 120 |
| 9 | 155 | 120 | 35 | 5 | 32 | 152 |
| 10 | 177 | 152 | 25 | 4 | 16 | 168 |
| 11 | 198 | 168 | 30 | 4 | 16 | 184 |
| 12 | 216 | 184 | 32 | 5 | 32 | 216 |
| 13 | 230 | 216 | 14 | 3 | 8 | 224 |
| 14 | 241 | 224 | 17 | 4 | 16 | 240 |
| 15 | 246 | 240 | 6 | 2 | 4 | 244 |
| 16 | 247 | 244 | 3 | 1 | 2 | 246 |
| 17 | 244 | 246 | -2 | -1 | -2 | 244 |
| 18 | 235 | 244 | -9 | -3 | -8 | 236 |
| 19 | 222 | 236 | -14 | -3 | -8 | 228 |
| 20 | 206 | 228 | -22 | -4 | -16 | 212 |
| 21 | 186 | 212 | -26 | -4 | -16 | 196 |
| 22 | 164 | 196 | -32 | -5 | -32 | 164 |
| 23 | 141 | 164 | -23 | -4 | -16 | 148 |
| 24 | 117 | 148 | -31 | -4 | -16 | 132 |
| 25 | 93 | 132 | -39 | -5 | -32 | 100 |
| 26 | 71 | 100 | -29 | -4 | -16 | 84 |
| 27 | 51 | 84 | -33 | -5 | -32 | 52 |
| 28 | 34 | 52 | -18 | -4 | -16 | 36 |
| 29 | 21 | 36 | -15 | -3 | -8 | 28 |
| 30 | 12 | 28 | -16 | -4 | -16 | 12 |
| 31 | 8 | 12 | -4 | -2 | -4 | 8 |
| ⋮ | ⋮ | ⋮ | ⋮ | ⋮ | ⋮ | ⋮ |
| 157 | 8 | 12 | -4 | -2 | -4 | 8 |
| 158 | 10 | 8 | 2 | 1 | 2 | 10 |
| 159 | 16 | 10 | 6 | 2 | 4 | 14 |
| 160 | 27 | 14 | 13 | 3 | 8 | 22 |
| 161 | 43 | 22 | 21 | 4 | 16 | 38 |
| 162 | 61 | 38 | 23 | 4 | 16 | 54 |
| 163 | 82 | 54 | 28 | 4 | 16 | 70 |
| 164 | 105 | 70 | 35 | 5 | 32 | 102 |
| 165 | 129 | 102 | 27 | 4 | 16 | 118 |
| 166 | 153 | 118 | 35 | 5 | 32 | 150 |
| 167 | 176 | 150 | 26 | 4 | 16 | 166 |
| 168 | 197 | 166 | 31 | 4 | 16 | 182 |
| 169 | 215 | 182 | 33 | 5 | 32 | 214 |
| 170 | 229 | 214 | 15 | 3 | 8 | 222 |
| 171 | 240 | 222 | 18 | 4 | 16 | 238 |
| 172 | 246 | 238 | 8 | 3 | 8 | 246 |
| 173 | 247 | 246 | 1 | 0 | 1 | 247 |
| 174 | 244 | 247 | -3 | -1 | -2 | 245 |
| 175 | 236 | 245 | -9 | -3 | -8 | 237 |
| 176 | 224 | 237 | -13 | -3 | -8 | 229 |
| 177 | 207 | 229 | -22 | -4 | -16 | 213 |
| 178 | 188 | 213 | -25 | -4 | -16 | 197 |
| ⋮ | ⋮ | ⋮ | ⋮ | ⋮ | ⋮ | ⋮ |

FIG. 15

| VARIATION VALUE | GRADATION VALUE OF VIDEO DATA | | | | | | ... | 100 | 101 | 102 | 103 | ... | 237 | 238 | 239 | 240 |
|---|---|---|---|---|---|---|---|---|---|---|---|---|---|---|---|---|
| | 0 | 1 | 2 | 3 | 4 | | | | | | | | | | | |
| 0 | 0 | 0 | 0 | 0 | 0 | | | 6 | 6 | 6 | 6 | | 14 | 14 | 14 | 15 |
| 1 | 0 | 0 | 0 | 0 | 0 | | | 6 | 6 | 6 | 6 | | 14 | 14 | 15 | 15 |
| 2 | 0 | 0 | 0 | 0 | 0 | | | 6 | 6 | 6 | 6 | | 14 | 15 | 15 | 15 |
| 3 | 0 | 0 | 0 | 0 | 0 | | | 6 | 6 | 6 | 6 | | 15 | 15 | 15 | 15 |
| 4 | 0 | 0 | 0 | 0 | 0 | | | 6 | 6 | 6 | 6 | | 15 | 15 | 15 | 15 |
| 5 | 0 | 0 | 0 | 0 | 0 | | | 6 | 6 | 6 | 6 | | 15 | 15 | 15 | 15 |
| 6 | 0 | 0 | 0 | 0 | 0 | | | 6 | 6 | 6 | 6 | | 15 | 15 | 15 | 15 |
| 7 | 0 | 0 | 0 | 0 | 0 | | | 6 | 6 | 6 | 6 | | 15 | 15 | 15 | 15 |
| 8 | 0 | 0 | 0 | 0 | 0 | | | 6 | 6 | 6 | 7 | | 15 | 15 | 15 | 15 |
| 9 | 0 | 0 | 0 | 0 | 0 | | | 6 | 6 | 7 | 7 | | 15 | 15 | 15 | 15 |
| 10 | 0 | 0 | 0 | 0 | 0 | | | 6 | 7 | 7 | 7 | | 15 | 15 | 15 | 15 |
| 11 | 0 | 0 | 0 | 0 | 1 | | | 7 | 7 | 7 | 7 | | 15 | 15 | 15 | 15 |
| 12 | 0 | 0 | 0 | 1 | 1 | | | 7 | 7 | 7 | 7 | | 15 | 15 | 15 | 15 |
| 13 | 0 | 0 | 1 | 1 | 1 | | | 7 | 7 | 7 | 7 | | 15 | 15 | 15 | 15 |
| 14 | 0 | 1 | 1 | 1 | 1 | | | 7 | 7 | 7 | 7 | | 15 | 15 | 15 | 15 |
| 15 | 1 | 1 | 1 | 1 | 1 | | | 7 | 7 | 7 | 7 | | 15 | 15 | 15 | 15 |

| INTEGRAL VALUE | 0 | 1 | 2 | 3 | 4 | ... | 100 | 101 | 102 | 103 | ... | 237 | 238 | 239 | 240 |

FIG. 16

| VARIATION VALUE | GRADATION VALUE OF VIDEO DATA | | | | | | | | | | | | | | | |
|---|---|---|---|---|---|---|---|---|---|---|---|---|---|---|---|---|
| | 0 | 1 | 2 | 3 | 4 | ... | 100 | 101 | 102 | 103 | ... | 237 | 238 | 239 | 240 |
| 0 | 0 | 0 | 0 | 0 | 0 | | 6 | 6 | 6 | 6 | | 14 | 14 | 14 | 15 |
| 15 | 0 | 1 | 1 | 1 | 1 | | 7 | 7 | 7 | 7 | | 15 | 15 | 15 | 15 |
| 7 | 0 | 0 | 0 | 0 | 0 | | 6 | 6 | 6 | 6 | | 15 | 15 | 15 | 15 |
| 8 | 0 | 0 | 0 | 0 | 0 | | 6 | 6 | 6 | 6 | | 15 | 15 | 15 | 15 |
| 3 | 0 | 0 | 0 | 0 | 0 | | 6 | 6 | 6 | 6 | | 15 | 15 | 15 | 15 |
| 12 | 0 | 0 | 0 | 0 | 1 | | 7 | 7 | 7 | 7 | | 15 | 15 | 15 | 15 |
| 4 | 0 | 0 | 0 | 0 | 0 | | 6 | 6 | 6 | 6 | | 15 | 15 | 15 | 15 |
| 11 | 0 | 0 | 0 | 0 | 0 | | 6 | 6 | 6 | 6 | | 15 | 14 | 15 | 15 |
| 1 | 0 | 0 | 1 | 1 | 1 | | 6 | 7 | 7 | 7 | | 14 | 15 | 15 | 15 |
| 14 | 0 | 0 | 0 | 0 | 0 | | 7 | 6 | 6 | 6 | | 15 | 15 | 15 | 15 |
| 6 | 0 | 0 | 0 | 0 | 0 | | 6 | 6 | 6 | 6 | | 15 | 15 | 15 | 15 |
| 9 | 0 | 0 | 0 | 0 | 0 | | 6 | 6 | 6 | 6 | | 14 | 15 | 15 | 15 |
| 2 | 0 | 0 | 0 | 1 | 1 | | 7 | 7 | 7 | 7 | | 15 | 15 | 15 | 15 |
| 13 | 0 | 0 | 0 | 0 | 0 | | 6 | 6 | 6 | 6 | | 15 | 15 | 15 | 15 |
| 5 | 0 | 0 | 0 | 0 | 0 | | 6 | 6 | 6 | 6 | | 15 | 15 | 15 | 15 |
| 10 | 0 | 0 | 0 | 0 | 0 | | 6 | 6 | 7 | 7 | | 15 | 15 | 15 | 15 |

| INTEGRAL VALUE | 0 | 1 | 2 | 3 | 4 | | 100 | 101 | 102 | 103 | | 237 | 238 | 239 | 240 |

VIDEO DISPLAY SYSTEM AND VIDEO DISPLAY METHOD

TECHNICAL FIELD

The present disclosure relates to a video display system and a video display method suitable for displaying a video having a relatively high frame rate.

BACKGROUND ART

A video display system that displays a video on a display apparatus by performing image processing or transmission for a video (moving image) is generally designed to operate at a frame rate of 60 fps (frames per second) or less in consideration of human vision. In the video display system, for example, when the frame rate is 60 fps, since the time per frame is approximately 16.6 ms, a plurality of images are processed and transmitted until a video generated by an imaging device is displayed on a display apparatus, and thus, a certain amount of delay (for example, 100 ms) is generated in the entire system.

Delay in video display for the imaging (video output) can adversely affect stability of an operation of a robot or the like in a real-time system involving feedback, such as when an industrial robot picks up an irregularly moving target. Further, removing the delay in video display is also beneficial for a video display system used for endoscopic surgery and remote surgery using a real-time video, a remote control of a disaster relief robot, and the like.

Meanwhile, it is conceivable to remove (suppress) the delay by applying a relatively high frame rate (for example, 960 fps) to the video, but when the frame rate is simply increased, the amount of transmission and the amount of calculation increase.

In the related art, as a technique for suppressing the amount of transmission while maintaining a high resolution of a video, for example, a technique is known in which, regarding a video imaged by a monitoring camera, attention is paid to a vicinity of a door where a person enters and exits, and a target monitoring area to be monitored is displayed at a high frame rate, and an area that is a background of a target monitoring area such as a place where plants are placed or a wall is transmitted at a low frame rate in consideration of effective use of a network bandwidth.

CITATION LIST

Patent Literature

PTL 1: Japanese Patent Unexamined Publication No. 2008-219484

SUMMARY OF THE INVENTION

However, in the related art described in Patent Literature 1, a high frame rate of approximately 30 fps is assumed, but since maintaining a high resolution of a video is premised, when a higher frame rate (for example, 960 fps) is applied, even if application of the high frame rate is a part (target monitoring area) of the image, an increase in the amount of transmission and the amount of calculation may be a problem.

The present disclosure is made in view of the problem of the related art, and a main object of the present disclosure is to provide a video display system and a video display method that can suppress an increase in the amount of transmission and the amount of calculation of a video while suppressing a decrease in quality of a displayed video when a video (video having a frame rate of more than 60 fps) having a relatively high frame rate is transmitted from an imaging device to a display apparatus.

A video display system of the present disclosure includes an imaging device that sequentially generates captured video data of a first gradation having a first bit number by imaging and sequentially outputs display video data of a second gradation having a second bit number smaller than the first bit number, based on the captured video data, and a display apparatus that sequentially displays a video based on the display video data from the imaging device, in which, in the display apparatus, when a plurality of frames continuous in time series are displayed based on the display video data, although a first gradation value based on the first gradation of a predetermined pixel included in the captured video data corresponding to the plurality of frames does not change in the imaging device, a second gradation value based on the second gradation of the predetermined pixel included in the display video data corresponding to the plurality of frames varies.

Further, a video display method of the present disclosure is performed by a video display system including an imaging device that sequentially generates captured video data of a first gradation having a first bit number by imaging and sequentially outputs display video data of a second gradation having a second bit number smaller than the first bit number, based on the captured video data, and a display apparatus that sequentially displays a video based on the display video data from the imaging device, and the method includes varying a second gradation value based on the second gradation of a predetermined pixel included in the display video data corresponding to a plurality of frames, in the display apparatus, when the plurality of frames continuous in time series are displayed based on the display video data, although a first gradation value based on the first gradation of the predetermined pixel included in the captured video data corresponding to the plurality of frames does not change in the imaging device.

According to the present disclosure, it is possible to suppress an increase in the amount of transmission and the amount of calculation of a video while suppressing a decrease in quality of a displayed video, when a video (video having a frame rate of more than 60 fps) having a relatively high frame rate is transmitted from an imaging device to a display apparatus.

BRIEF DESCRIPTION OF DRAWINGS

FIG. 3 is an explanatory diagram illustrating an operation example of the video display system according to the first exemplary embodiment.

FIG. 6 is an explanatory diagram illustrating a first operation example of the video display system according to the second exemplary embodiment.

FIG. 8 is an explanatory diagram illustrating a second operation example of the video display system according to the second exemplary embodiment.

FIG. 12 is an explanatory diagram illustrating an operation example of the video display system according to the modification example of the second exemplary embodiment.

FIG. 15 is an explanatory diagram illustrating a first operation example of the video display system according to the third exemplary embodiment.

FIG. 16 is an explanatory diagram illustrating a second operation example of the video display system according to the third exemplary embodiment.

DESCRIPTION OF EMBODIMENTS

Figure 1:
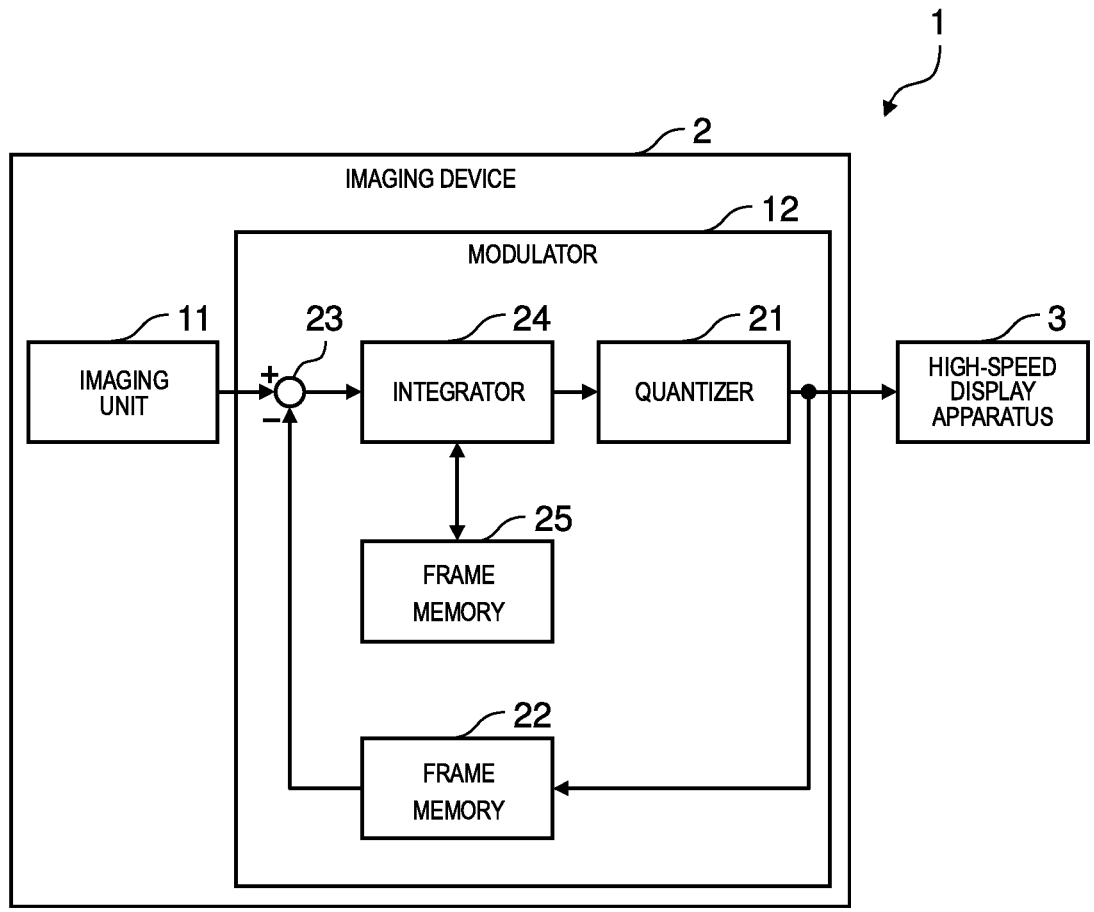
FIG. 1 is an entire configuration diagram of a video display system according to a first exemplary embodiment.

A first invention for solving the problems described above, includes an imaging device that sequentially generates captured video data of a first gradation having a first bit number by imaging and sequentially outputs display video data of a second gradation having a second bit number smaller than the first bit number, based on the captured video data, and a display apparatus that sequentially displays a video based on the display video data from the imaging device, in which, in the display apparatus, when a plurality of frames continuous in time series are displayed based on the display video data, although a first gradation value based on the first gradation of a predetermined pixel included in the captured video data corresponding to the plurality of frames does not change in the imaging device, a second gradation value based on the second gradation of the predetermined pixel included in the display video data corresponding to the plurality of frames varies.

According to this, when a video (video having a frame rate of more than 60 fps) having a relatively high frame rate is transmitted from an imaging device to a display apparatus, display video data having a gradation lower than a gradation of captured video data is transmitted, and while displaying a plurality of frames on a display apparatus, the gradation can be restored by human visual characteristics, and thus, it is possible to suppress an increase in the amount of transmission and the amount of calculation of a video while suppressing a decrease in quality of a displayed video.

Further, according to a second invention, the imaging device includes an imaging unit that generates the captured video data and a modulator that generates the display video data by quantizing the captured video data, and the amount of variation of the second gradation value of the display apparatus is correlates a gradation value component smaller than the second gradation generated by the quantization of the modulator.

According to this, a gradation value component lost by quantization of an imaging device can be recovered by human visual characteristics while displaying a plurality of frames on the display apparatus, and thus, it is possible to effectively suppress a decrease in quality of a displayed video.

Further, according to a third invention, the display apparatus includes a display device that displays a video, a first video input unit that receives the display video data from the imaging device at a frame rate exceeding 60 fps, a second video input unit that receives external video data at a frame rate of 60 fps or less from an external apparatus different from the imaging device, and a switch that selectively inputs the display video data from the first video input unit and the external video data from the second video input unit to the display device.

According to this, a display apparatus that can display a video having a frame rate exceeding 60 fps input from an imaging device can display a video (normal video) having a frame rate of 60 fps or less input from an external apparatus, and thus, convenience of a user is improved.

Further, according to a fourth invention, the modulator includes a quantizer that sequentially outputs quantized data obtained by quantizing input data based on the captured video data into the display video data, a storage that sequentially stores the quantized data output from the quantizer, a difference calculator that sequentially calculates differences between the captured video data of the first gradation for a current frame and the quantized data for a previous frame stored in the storage, and an integrator that sequentially outputs integral data obtained by sequentially integrating the differences output from the difference calculator as the input data of the quantizer.

According to this, a configuration is provided in which a gradation of captured video data is decreased by quantization and information (lower bits) excluded by the quantization is reflected in a subsequent frame, and thus, when a video having a relatively high frame rate is transmitted, it is possible to suppress an increase in the amount of transmission and the amount of calculation of a video while suppressing a decrease in quality of a displayed video.

Further, according to a fifth invention, the modulator includes a quantizer that sequentially outputs quantized data obtained by quantizing input data based on the captured video data into the display video data, a storage that sequentially stores the quantized data output from the quantizer, an integrator that sequentially outputs integral data obtained by sequentially integrating the quantized data stored in the storage, and a difference calculator that sequentially calculates differences between the captured video data of the first gradation and the integral data and sequentially outputs the calculated differences as the input data of the quantizer.

According to this, a configuration is provided in which a gradation of captured video data is decreased by quantization and information (lower bits) excluded by the quantization is reflected in a subsequent frame, and thus, when a video having a relatively high frame rate is transmitted, it is possible to suppress an increase in the amount of transmission and the amount of calculation of a video while suppressing a decrease in quality of a displayed video.

Further, according to a sixth invention, the modulator includes an oscillator that sequentially generates variation value data having the second bit number statistically or stochastically, an adder that sequentially adds the variation value data to the captured video data of the first gradation, and a quantizer that sequentially outputs quantized data obtained by quantizing data output from the adder into the display video data of the second gradation.

According to this, a configuration is provided in which a gradation of captured video data is decreased by quantization and information excluded by the quantization is reflected as variation value data to be replaced, and thus, when a video having a relatively high frame rate is transmitted, it is possible to suppress an increase in the amount of transmission and the amount of calculation of a video while suppressing a decrease in quality of a displayed video.

Further, according to a seventh invention, a video display method performed by a video display system including an imaging device that sequentially generates captured video data of a first gradation having a first bit number by imaging and sequentially outputs display video data of a second gradation having a second bit number smaller than the first bit number, based on the captured video data, and a display apparatus that sequentially displays a video based on the display video data from the imaging device, includes varying a second gradation value based on the second gradation of the predetermined pixel included in the display video data corresponding to the plurality of frames, in the display apparatus, when a plurality of frames continuous in time series are displayed based on the display video data, although a first gradation value based on the first gradation of a predetermined pixel included in the captured video data corresponding to the plurality of frames does not change in the imaging device.

According to this, when a video (video having a frame rate of more than 60 fps) having a relatively high frame rate is transmitted from an imaging device to a display apparatus, display video data having a gradation lower than a gradation of captured video data is transmitted, and while displaying a plurality of frames on a display apparatus, the gradation can be restored by human visual characteristics, and thus, it is possible to suppress an increase in the amount of transmission and the amount of calculation of a video while suppressing a decrease in quality of a displayed video.

Hereinafter, exemplary embodiments of the present disclosure will be described with reference to the drawings.

First Exemplary Embodiment

Figure 2:
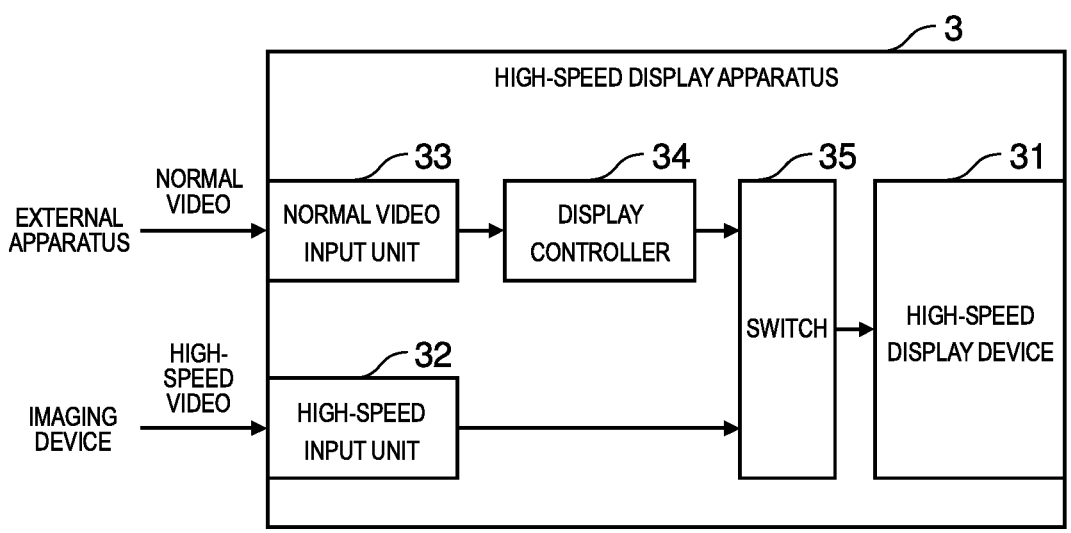
FIG. 2 is a diagram illustrating details of a high-speed display apparatus according to the first exemplary embodiment.

FIG. 1 is an entire configuration diagram of video display system 1 according to a first exemplary embodiment of the present disclosure, and FIG. 2 is a diagram illustrating details of high-speed display apparatus 3 illustrated in FIG. 1.

As illustrated in FIG. 1, video display system 1 mainly includes imaging device 2 that images a certain object, and high-speed display apparatus (display apparatus) 3 to which video data (a video signal) output from imaging device 2 is input in real time.

Imaging device 2 includes imaging unit 11 that generates video data (captured video data) of a first gradation having a first bit number (for example, 8 bits) by imaging, and modulator 12 that generates video data (display video data) of a second gradation by quantizing the video data of the first gradation.

Imaging unit 11 is configured by a high-speed camera capable of outputting a video having a relatively high frame rate (here, 960 fps) exceeding human visual time sensitivity (that is, temporal resolution of visual information processing). The video data generated by imaging unit 11 are sequentially input to modulator 12. Although gradation of a video (video data) captured by imaging unit 11 is not limited in particular, the gradation can be set to, for example, 8 bits (24-bit color) for each of RGB. Further, imaging unit 11 has a known image processing function of performing image processing necessary for a captured video.

Modulator 12 outputs video data of a second gradation having a second bit number (for example, 4 bits) smaller than the first bit number by encoding the video data input from imaging device 2. Quantizer 21 in modulator 12 quantizes data (input data) based on the video data of the first gradation (for example, 8 bits) output from integrator 24 into video data of the second gradation (for example, 4 bits) and sequentially outputs the quantized data. For example, quantizer 21 can obtain higher 4 bits of the 8-bit input data of the first gradation (that is, discards low 4 bits), thereby, generating data (quantized data) whose gradation is lowered to the second gradation. The quantized data are sequentially output to high-speed display apparatus 3 as video data and are sequentially stored in first frame memory 22 configured by a known memory such as a synchronous dynamic RAM (SDRAM).

Further, difference calculator 23 in modulator 12 sequentially calculates differences between the 8-bit video data for the current frame sequentially input from imaging device 2 and the quantized data for a previous frame (here, an immediately preceding frame) stored in first frame memory 22. With this configuration, information of the low 4 bits rounded down by processing of quantizer 21 can be sequentially reflected in a subsequent frame by a feedback loop via first frame memory 22 and difference calculator 23. Further, integrator 24 sequentially outputs integral data obtained by sequentially integrating differences output from difference calculator 23 as input data of quantizer 21. Further, the calculated integral data are sequentially stored in second frame memory 25 configured by a known memory such as an SDRAM and are sequentially read when calculating next integral data.

As illustrated in FIG. 2, high-speed display apparatus 3 includes high-speed display device 31 configured by a liquid crystal display, a plasma display, or the like having a known structure, and can display a high-speed video (video data) from imaging device 2 input from high-speed video input unit (first video input unit) 32 configuring an input interface at a frame rate of at least 60 fps. Further, high-speed display apparatus 3 includes normal video input unit (second video input unit) 33 configuring an input interface for receiving a normal video (external video data) at a frame rate of 60 fps or less from a certain external apparatus different from imaging device 2. Video input from an external apparatus can be performed via a cable compliant with standards such as HDMI (registered trademark) and a digital visual interface (DVI). The normal video is displayed on high-speed display device 31 after video adjustment or the like is performed by known display controller 34. Furthermore, high-speed display apparatus 3 includes switch 35 capable of selectively outputting a high-speed video signal from high-speed video input unit 32 and a normal video signal from normal video input unit 33 (display controller 34) to high-speed display device 31 according to an operation of a user.

High-speed display apparatus 3 has a configuration that can display a high-speed video having a frame rate exceeding 60 fps input from imaging device 2 while displaying a normal video having a frame rate of 60 fps or less input from an external apparatus, and thus, convenience of a user is improved. High-speed display apparatus 3 may have at least a configuration that can display a high-speed video from imaging device 2, and the above-described configuration for displaying a normal video can be omitted.

In such video display system 1, a video having a relatively high frame rate captured by imaging device 2 can be displayed on high-speed display apparatus 3 while suppressing degradation of quality and without a large delay even when transmitted to high-speed display apparatus 3. Video display system 1 is suitable for use in, for example, endoscopic surgery and remote surgery using a real-time video, a remote control of a disaster rescue robot, and so on.

FIG. 3 is an explanatory diagram illustrating an operation example of video display system 1 according to the first exemplary embodiment.

FIG. 3 illustrates a case in which each gradation value of 8-bit video data set from 0 to 240 at times t0 to t15 set at a predetermined time interval (for example, 1 ms) is input from imaging unit 11 to modulator 12 as an operation example of video display system 1 according to the first exemplary embodiment. Here, for the sake of convenient description, a case in which the respective gradation values (the same gradation value) are continuously input (the respective gradation values do not change over 16 frames) for predetermined pixels of 16 frames respectively corresponding to the times t0 to t15 is illustrated. However, the gradation values of actual video data can be appropriately changed for each frame.

Here, quantizer 21 converts the gradation values of the 8-bit video data into 4-bit video data configured by gradation values of 0 to 15 and sequentially outputs the data. For example, when the gradation value of the video data is 3, an initial value output from the quantizer 21 is a value obtained by dividing 3 by 16 (however, when a numerical value less than 1 is generated, the value is rounded down (the same applies hereinafter)), and an initial value of the integral value (an output value from integrator 24) is 0.

Further, when the gradation value of the video data is 3, at time t0, the output value from quantizer 21 (consequently, an output value from imaging device 2) becomes 0 which is a value obtained by dividing a value obtained by adding the gradation value 3 of the video data to the initial value 0 of the integral value by 16, and the integral value becomes 3 which is a value obtained by adding a difference (that is, a value calculated by difference calculator 23) between the gradation value 3 of the video data and the initial value output from quantizer 21 to the initial value 0. Here, a value inversely quantized by multiplying the value output from quantizer 21 by 16 is used for calculation of difference performed by difference calculator 23 (the same applies hereinafter).

At the subsequent time t1, the value output from quantizer 21 becomes 0 which is a value obtained by dividing a value obtained by adding the gradation value 3 of the video data to the integral value 3 at time t0 by 16, and the integral value becomes 6 which is a value obtained by adding a difference between the gradation value 3 of the video data and the value output from quantizer 21 at the time t0 to the integral value 3 of the time t0.

At the subsequent time t2, the value output from quantizer 21 becomes 0 which is a value obtained by dividing a value obtained by adding the gradation value 3 of the video data to the integral value 6 at time t1 by 16, and the integral value becomes 9 which is a value obtained by adding a difference between the gradation value 3 of the video data and the value output from quantizer 21 at the time t1 to the integral value 6 of the time t1. Thereafter, the output value from quantizer 21 and the integral value at time t3 to time t15 are also set in the same manner as in the above-described case. Further, even when the gradation value of the video data is other than 3, the output value from quantizer 21 and the integral value at the times t0 to t15 can be obtained in the same manner as in the above-described case.

Further, for each gradation value, a value (inversely quantized value of the average value) obtained by multiplying an average value of the output values from quantizer 21 at times t0 to t15 by 16 is approximately the same as an original gradation value.

As such, imaging device 2 according to the first exemplary embodiment is configured to reduce the gradation of the video data input from imaging unit 11 to modulator 12 by quantization and to reflect the information (here, the low 4 bits) excluded by the quantization in the subsequent frame via the integral value of integrator 24. Therefore, when transmitting a video (for example, video having a frame rate exceeding 60 fps) having a relatively high frame rate exceeding the human visual time sensitivity, it is possible to suppress an increase in the amount of transmission and the amount of calculation of a video while suppressing a decrease in quality of the display video of high-speed display apparatus 3.

According to the example of FIG. 3 described above, in high-speed display apparatus 3, when a plurality of frames continuous in time series are displayed based on video data from imaging device 2, although a gradation value (first gradation value) of a predetermined pixel included in video data of the first gradation (for example, 8 bits) of imaging unit 11 corresponding to the plurality of frames remains as 3 without a change, a gradation value (second gradation value) of a predetermined pixel included in video data of the second gradation (for example, 4 bits) from imaging device 2 corresponding to the plurality of frames varies between −1 and 2. Further, the amount of variation in the gradation value of the predetermined pixel included in the video data of the second gradation from imaging device 2 correlates information (a gradation value component smaller than the second gradation) of lower bits (here, lower 4 bits) rounded down by processing of quantizer 21 described above.

In this case, although the data of the second gradation (here, 4 bits) is output from imaging device 2, a user who views a video displayed on high-speed display apparatus 3 perceives videos of approximately 10 to 20 frames (corresponds to a plurality of frames at times t0 to t15 of each gradation value in the example of FIG. 3) as superimposed afterimages with respect to gradation despite recognizing only one-frame delay with respect to movement of the displayed object in terms of nature of a human vision. Thus, an effect is obtained as if the gradation excluded by imaging device 2 is visually recovered (as if a video of the first gradation (here, 8 bits) is displayed). Further, even when some data is lost during transmission of the video data from imaging device 2 to high-speed display apparatus 3, only a temporary drop in gradation occur and continuous decoding impossibility does not occur. Therefore, there is also an advantage that a system operation can be continued without performing a retransmission control.

Video display system 1 includes other exemplary embodiments and a plurality of modification examples which will be described below, reduces the gradation of the video data for the current frame generated by imaging device 2 by quantization, and the low bits (for example, low 4 bits in 8 bits) excluded by this quantization or substitute data corresponding to the low bits based on a statistical or stochastic method may be configured to be able to affect the high bits (for example, higher 4 bits in 8 bits) of the video data for the subsequent frame.

Further, an operation of modulator 12 of imaging device 2 according to the first exemplary embodiment is similar to A (delta sigma) modulation used for encoding a conventional audio signal. However, the A modulation processing on the audio signal improves audio quality by reducing an alias noise that may occur in the quantization of the audio signal, and has a different purpose and effect from the video processing of modulator 12.

Second Exemplary Embodiment

Figure 4:
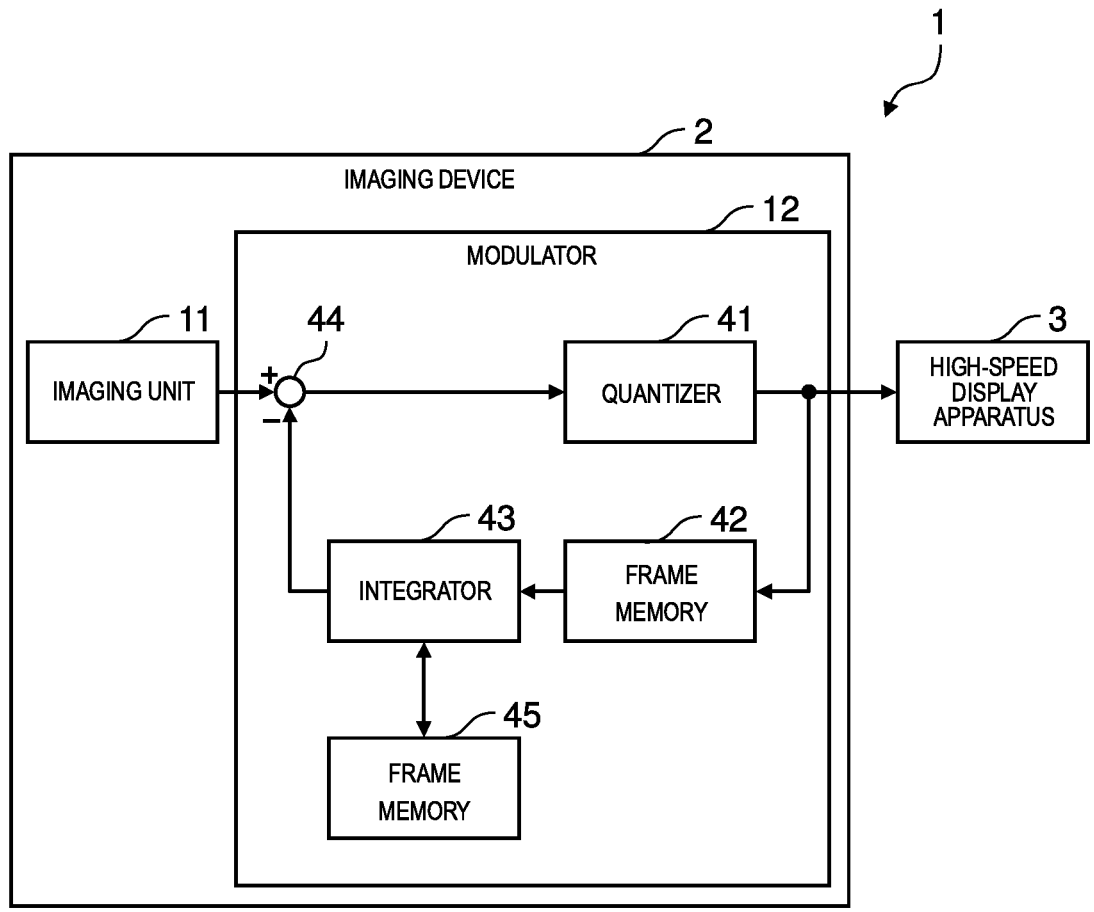
FIG. 4 is an entire configuration diagram of a video display system according to a second exemplary embodiment.
Figure 5:
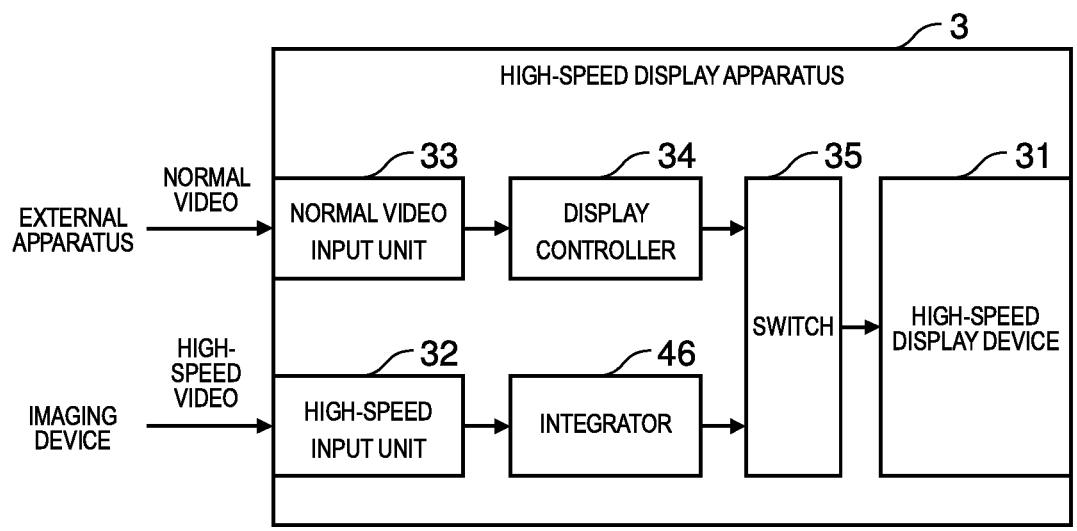
FIG. 5 is a diagram illustrating details of a high-speed display apparatus according to the second exemplary embodiment.

FIG. 4 is an entire configuration diagram of video display system 1 according to a second exemplary embodiment of the present disclosure, and FIG. 5 is a diagram illustrating details of the high-speed display apparatus 3 illustrated in FIG. 4. In FIGS. 4 and 5, configurations corresponding to video display system 1 illustrated in FIGS. 1 and 2 are denoted by the same reference numerals. Regarding the second exemplary embodiment, items that are not described in particular below are the same as the items of video display system 1 according to the first exemplary embodiment described above, and thus, detailed description thereof will be omitted.

In modulator 12 of high-speed display apparatus 3 according to the second exemplary embodiment, quantizer 41 converts data (input data) based on the video data of the first gradation (for example, 8 bits) output from difference calculator 44 into video data of the second gradation (for example, 4 bits) and sequentially output the quantized video data, in the same manner as quantizer 21 described above. The quantized data are sequentially output to high-speed display apparatus 3 and are sequentially stored in first frame memory 42 configured by a known memory such as an SDRAM.

Integrator 43 sequentially outputs integral data obtained by sequentially integrating the data stored in first frame memory 42 to difference calculator 44. Further, the integral data are sequentially stored in second frame memory 45 configured by the known memory such as an SDRAM and are sequentially read when calculating next integral data.

Difference calculator 44 sequentially calculates differences between 8-bit video data for a current frame input from imaging unit 11 and the integral data from integrator 43 and sequentially outputs the difference data as input data of quantizer 41. With this configuration, information on the low 4 bits that are rounded down by processing of quantizer 41 can be reflected in a subsequent frame by a feedback loop via first frame memory 42, integrator 43, and difference calculator 44.

As illustrated in FIG. 5, high-speed display apparatus 3 includes integrator 46 to which video data regarding a high-speed video is input from high-speed video input unit 32. Integrator 46, like integrator 43 described above, sequentially integrates video data (that is, an output of quantizer 41) of a second gradation from imaging device 2. An integrated value output from integrator 46 is input to high-speed display device 31 via switch 35, and a video based on the video data from imaging device 2 is displayed.

Figure 7:
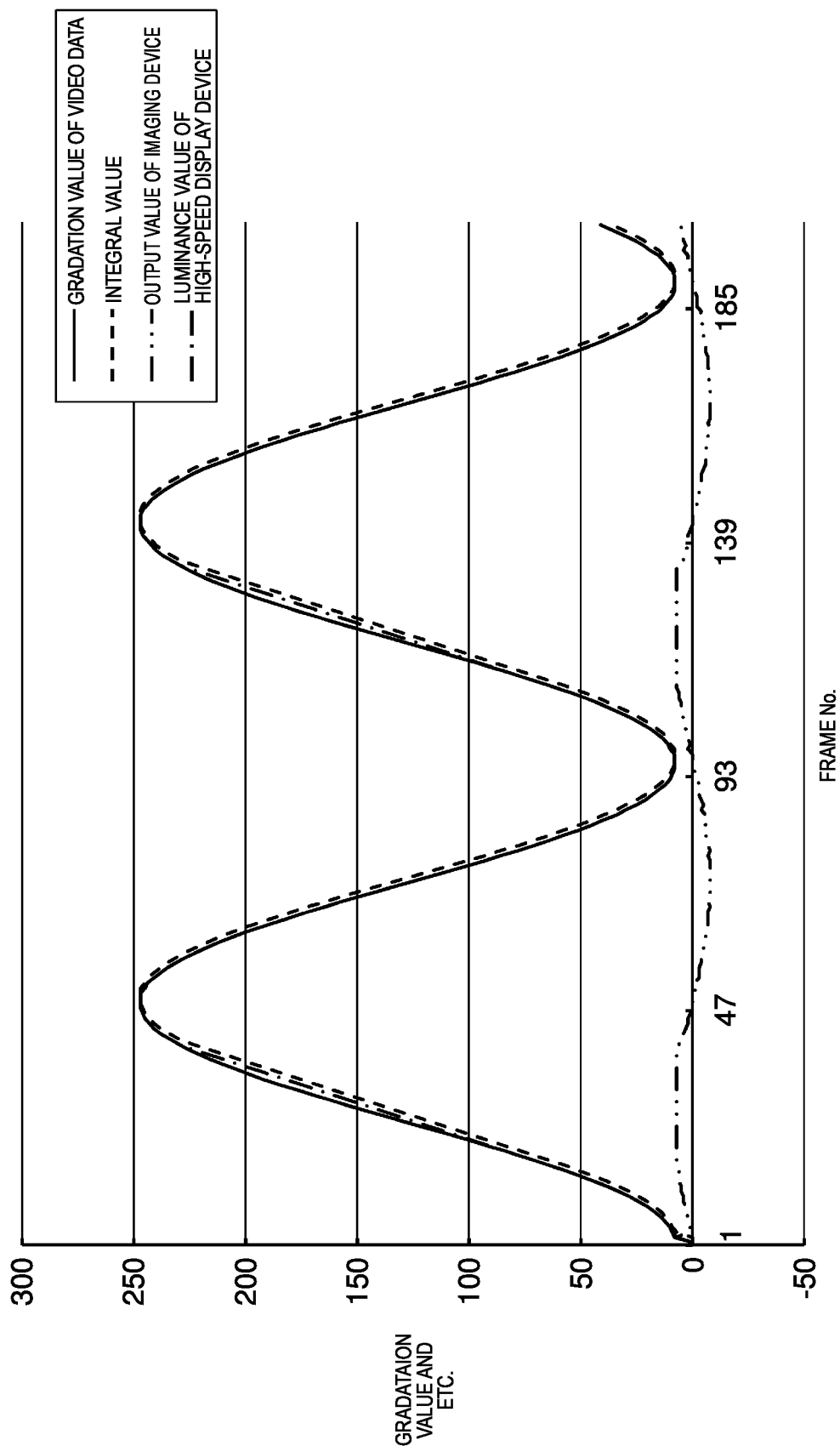
FIG. 7 is an explanatory diagram illustrating the first operation example of the video display system according to the second exemplary embodiment.
Figure 9:
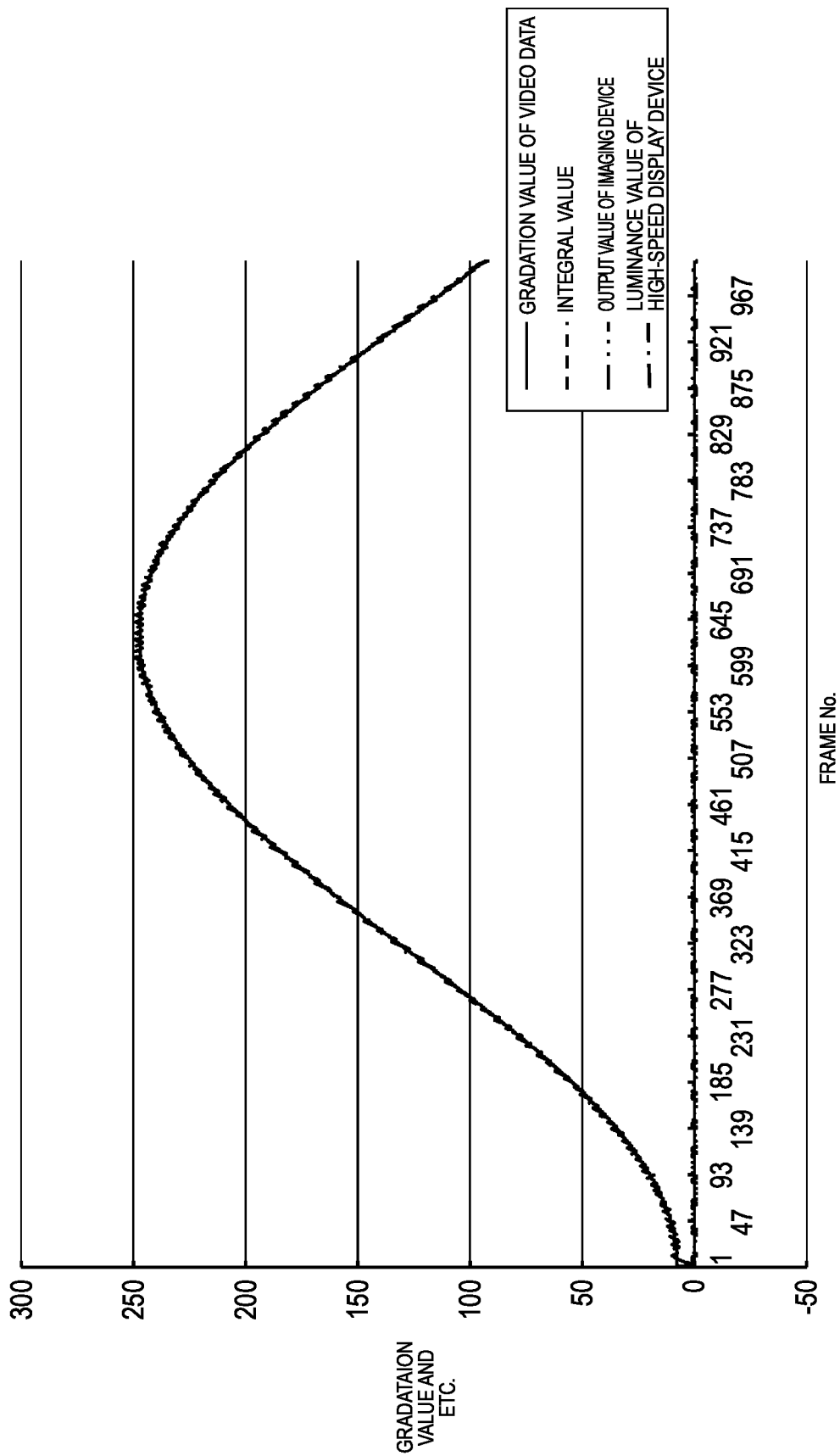
FIG. 9 is an explanatory diagram illustrating the second operation example of the video display system according to the second exemplary embodiment.

FIGS. 6 and 7 are explanatory diagrams illustrating a first operation example of video display system 1 according to the second exemplary embodiment and illustrate a numerical value example and a graph corresponding thereto, respectively. FIGS. 8 and 9 are explanatory diagrams illustrating a second operation example of video display system 1 according to the second exemplary embodiment and illustrate a numerical value example and a graph corresponding thereto, respectively. FIGS. 6 and 8 illustrate the numerical value example in which a part thereof is omitted.

FIGS. 6 and 7 illustrate a case in which the gradation value of the 8-bit video data (input data) set from 0 to 255 for a predetermined pixel of a frame input at a predetermined time interval (for example, 1 ms) is input from imaging unit 11 to modulator 12 while changing, as the first operation example of video display system 1 according to the second exemplary embodiment. However, the change in the gradation value of the actual video data is not limited to the change illustrated here and can be any change (the same applies to other operation examples which will be described below).

Here, quantizer 41 converts the gradation values of the 8-bit video data into 4-bit video data having gradation values of −8 to 7 and sequentially outputs the converted data. In FIG. 6, for example, in frame No. 1, the gradation value 8 of the video data is input, and 7 based on a difference (that is, a value calculated by difference calculator 44) between the gradation value 8 of the video data and an integral value 0 (an output value from integrator 43) becomes an output value from transmitter 2 (that is, the output value from quantizer 21). Here, when the difference value calculated by difference calculator 44 exceeds 7, the output value from imaging device 2 is set to an upper limit value 7, and when the difference value is less than −8, the output value from imaging device 2 is set to a lower limit value −8 (the same applies hereinafter). High-speed display apparatus 3 receives the output value 7 from imaging device 2 and adds the output value 7 to an initial luminance value 0 (see frame No. 0), and thereby, the luminance value 7 is set for display of a target pixel.

In a subsequent frame No. 2, a gradation value 9 of the video data is input, and 2 based on a value obtained by subtracting the integral value 7 (that is, the sum of the integral value 0 of the frame No. 1 and the output value 7 from imaging device 2) of the frame No. 2 from the gradation value 9 of the video data become the output value from imaging device 2. High-speed display apparatus 3 receives the output value 2 from imaging device 2 and adds the output value to the luminance value 7 (integral value) up to the frame No. 1, and thereby, the luminance value 9 is set for the display of the target pixel.

In a subsequent frame No. 3, a gradation value 10 of the video data is input, and 1 based on a value obtained by subtracting the integral value 9 (that is, the sum of the integral value 7 of the frame No. 2 and the output value 2 from imaging device 2) of the frame No. 3 from the gradation value 10 of the video data becomes the output value from imaging device 2. High-speed display apparatus 3 receives the output value 1 from imaging device 2 and adds the output value to the luminance value 9 (integral value) up to the frame No. 2, and thereby, the luminance value 10 is set for the display of the target pixel. Even in the frames after the frame No. 4, the integral value, the output value from imaging device 2, and the luminance value of high-speed display apparatus 3 are respectively set based on the gradation value of the video data to be input in the same manner as described above.

According to the examples of FIGS. 6 and 7, in high-speed display apparatus 3, when a plurality of frames (see, for example, frame No. 46 to 49) continuous in time series are displayed based on video data from imaging device 2, although a gradation value (first gradation value) of a predetermined pixel included in video data of the first gradation (for example, 8 bits) of imaging unit 11 corresponding to the plurality of frames does not change, a gradation value (second gradation value) of a predetermined pixel included in video data of the second gradation (for example, 4 bits) from imaging device 2 corresponding to the plurality of frames varies. Further, the amount of variation in the gradation value of the predetermined pixel included in the video data of the second gradation from imaging device 2 correlates information (a gradation value component smaller than the second gradation) of lower bit (here, lower 4 bits) rounded down by processing of quantizer 41.

Next, FIGS. 8 and 9 illustrate a case in which the gradation value of the 8-bit video data (input data) set from 0 to 255 for a predetermined pixel of a frame input at a predetermined time interval (for example, 1 ms) is input from imaging unit 11 to imaging device 2 while changing, as the second operation example of video display system 1 according to the second exemplary embodiment.

Here, quantizer 41 converts the gradation values of the 8-bit video data into 1-bit video data configured by gradation values of −1 and 1 and sequentially outputs the data. In FIG. 8, for example, a gradation value 8 of the video data is input in the frame No. 1, and 1 based on a difference (that is, the value 8 calculated by difference calculator 44) between the gradation value 8 of the video data and an integral value (the output value from integrator 43) becomes the output value (that is, the output value from quantizer 41) from imaging device 2. Here, when the difference value calculated by difference calculator 44 exceeds 1, the output value from imaging device 2 is set to the upper limit value 1, and when the difference value is less than −1, the output value from imaging device 2 is set to the lower limit value −1 (the same applies hereinafter). High-speed display apparatus 3 receives the output value 1 from imaging device 2 and adds the output value to the initial luminance value 0 (see frame No. 0), and thereby, the luminance value 1 is set for display of a target pixel.

In a subsequent frame No. 2, the gradation value 8 of the video data is input, and 1 based on a value (the difference value is 7) obtained by subtracting the integral value 1 (that is, the sum of the integral value 0 of the frame No. 1 and the output 1 from imaging device 2) of the frame No. 2 from the gradation value 9 of the video data becomes the output value from imaging device 2. High-speed display apparatus 3 receives the output value 1 from imaging device 2 and adds the output value to the luminance value 2 (integral value) up to the frame No. 1, and thereby, the luminance value 2 is set for the display of the target pixel.

In a subsequent frame No. 3, the gradation value 8 of the video data is input, and 1 based on a value (the difference value is 6) obtained by subtracting the integral value 2 (that is, the sum of the integral value 1 of frame No. 2 and the output value 1 from imaging device 2) of the frame No. 3 from the gradation value 8 of the video data becomes the output value of imaging device 2. High-speed display apparatus 3 receives the output value 1 from imaging device 2 and adds the output value to the luminance value 2 (integral value) up to the frame No. 2, and thereby, the luminance value 3 is set for the display of the target pixel. Even in the frames after the frame No. 4, the integral value, the output value from imaging device 2, and the luminance value of high-speed display apparatus 3 are respectively set based on the gradation value of the video data to be input in the same manner as described above.

According to the examples of FIGS. 8 and 9, in high-speed display apparatus 3, when a plurality of frames (see, for example, frame No. 1 to 16) continuous in time series are displayed based on video data from imaging device 2, although a gradation value (first gradation value) of a predetermined pixel included in video data of the first gradation (for example, 8 bits) of imaging unit 11 corresponding to the plurality of frames does not change, a gradation value (second gradation value) of a predetermined pixel included in video data of the second gradation (for example, 4 bits) from imaging device 2 corresponding to the plurality of frames varies. Further, the amount of variation in the gradation value of the predetermined pixel included in the video data of the second gradation from imaging device 2 correlates information (a gradation value component smaller than the second gradation) of lower bit (here, lower 4 bits) rounded down by processing of quantizer 41.

As such, video display system 1 according to the second exemplary embodiment is configured to reduce the gradation value of the video data input from imaging unit 11 to modulator 12 by quantization and to reflect the information excluded by the quantization in the subsequent frame via the integral value of integrator 43 in the same manner as video display system 1 according to the first exemplary embodiment described above. Therefore, when transmitting a video having a relatively high frame rate, it is possible to suppress an increase in the amount of transmission and the amount of calculation of the video while suppressing a decrease in quality of the display video of high-speed display apparatus 3 (that is, the gradation value of the video data is matched well with the luminance value of high-speed display apparatus 3, and the visual gradation is recovered, as illustrated in FIGS. 6 and 8).

Further, an operation of modulator 12 according to the second exemplary embodiment is similar to A (delta) modulation used for encoding a conventional audio signal. However, the A modulation processing on the audio signal improves audio quality by reducing an alias noise that may occur in the quantization of the audio signal, and has a different purpose and effect from the video processing of modulator 12.

Modification Example of Second Exemplary Embodiment

Figure 10:
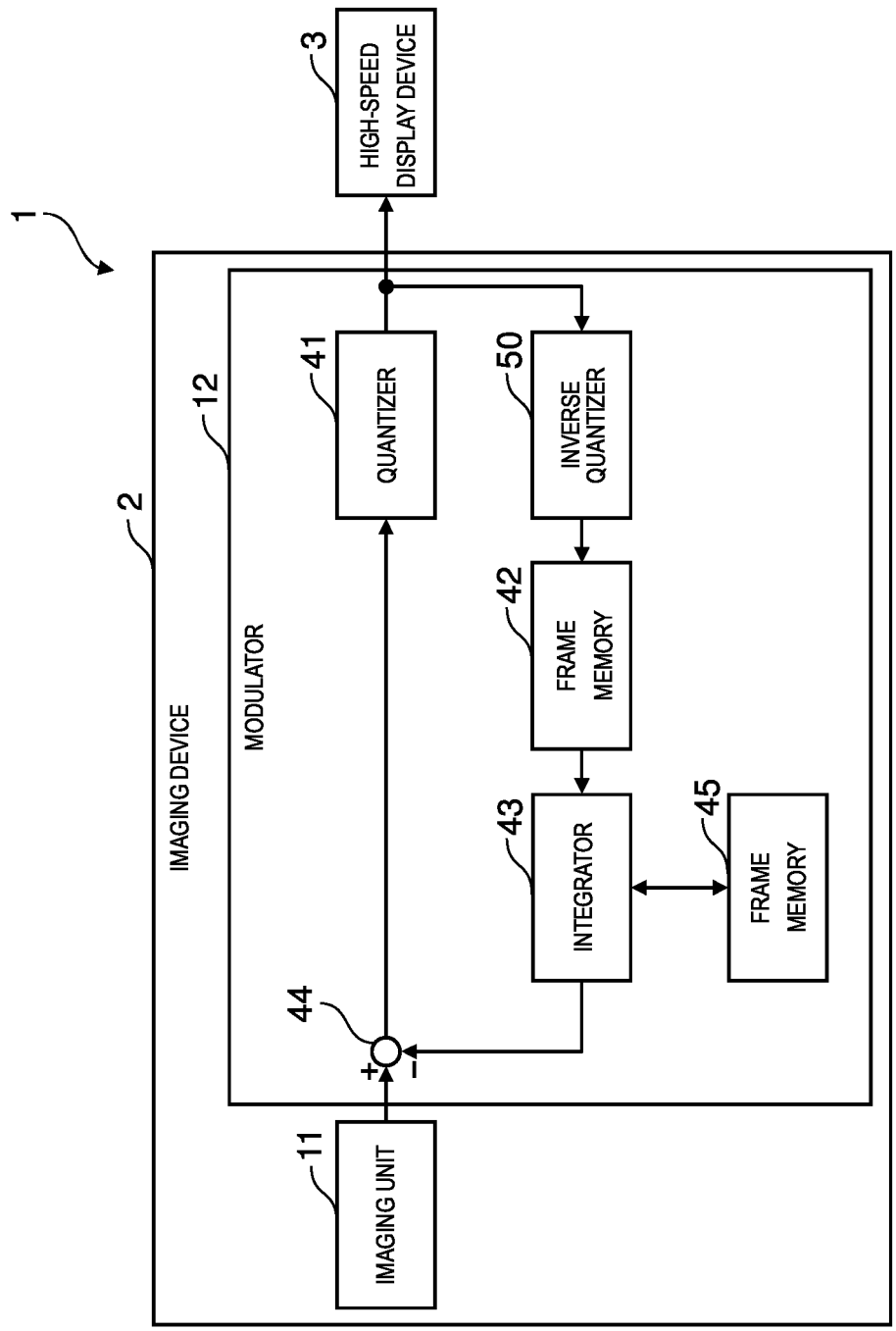
FIG. 10 is an entire configuration diagram of a video display system according to a modification example of the second exemplary embodiment.
Figure 11:
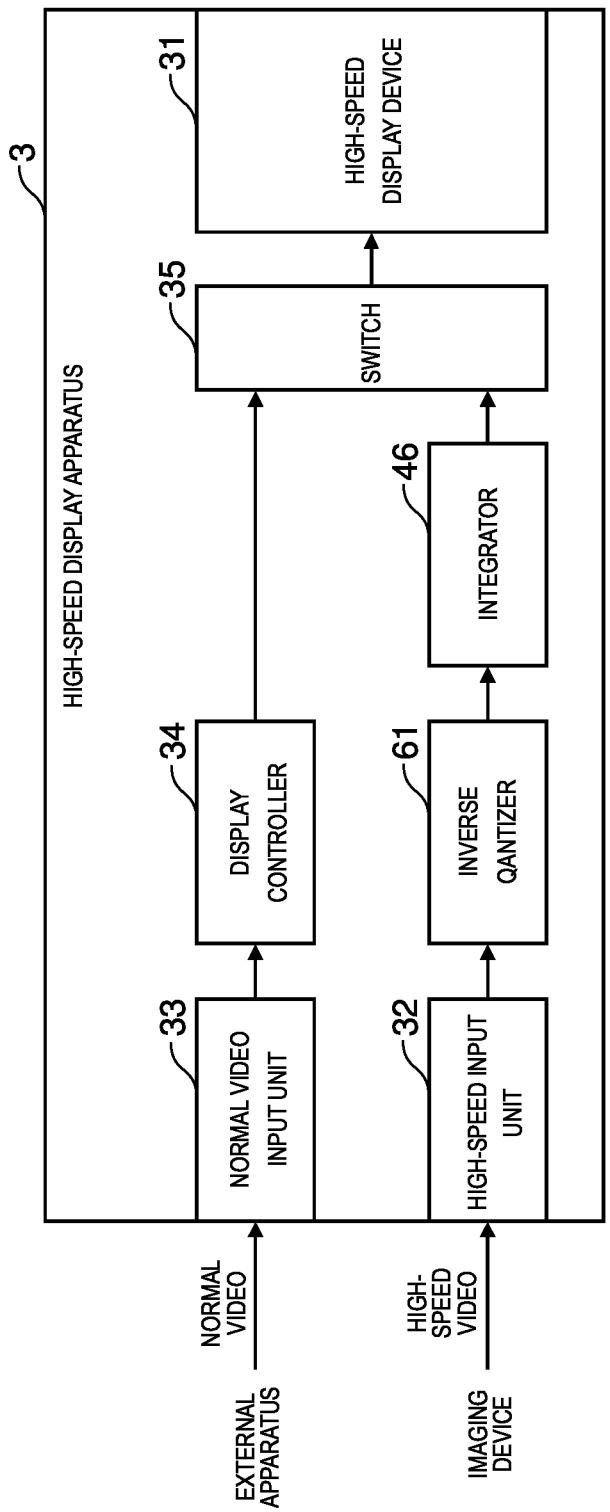
FIG. 11 is a diagram illustrating details of a high-speed display apparatus according to the modification example of the second exemplary embodiment.

FIG. 10 is an entire configuration diagram of a video display system according to a modification example of the second exemplary embodiment, and FIG. 11 is a diagram illustrating details of high-speed display apparatus 3 illustrated in FIG. 10. Regarding the modification example of the second exemplary embodiment, items that are not described in particular below are the same as the items of video display system 1 according to the first or second exemplary embodiment described above, and thus, detailed description thereof will be omitted.

In video display system 1 according to the modification example, quantizer 41 performs non-linear quantization and as illustrated in FIG. 10, inverse quantizer 50 that inversely quantizes an output from quantizer 41 is further included therein. The outputs, which are inversely quantized by inverse quantizer 50, from quantizer 41 are sequentially stored in first frame memory 42, in the same manner as video display system 1 according to the second exemplary embodiment described above.

Further, as illustrated in FIG. 11, high-speed display apparatus 3 includes inverse quantizer 61 for inversely quantizing video data regarding a high-speed video input from high-speed video input unit 32 in the same manner as inverse quantizer 50 described above. The video data inversely quantized by inverse quantizer 61 are sequentially input to integrator 46.

Figure 13:
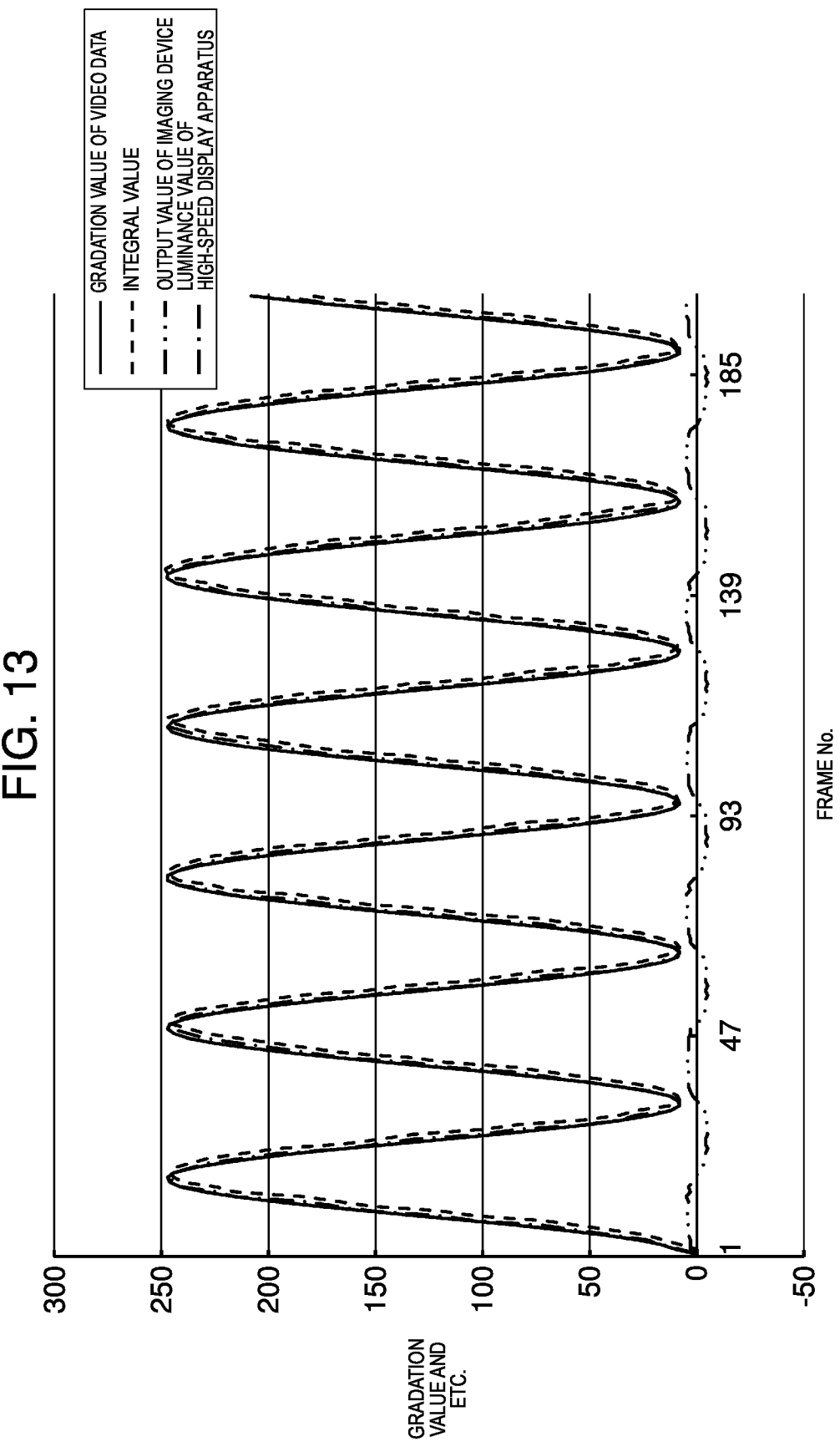
FIG. 13 is an explanatory diagram illustrating the operation example of the video display system according to the modification example of the second exemplary embodiment.

FIGS. 12 and 13 are explanatory diagrams illustrating an operation example of video display system 1 according to the second exemplary embodiment and illustrate a numerical value example and a graph corresponding thereto, respectively. A part of the numerical value example of FIG. 12 is omitted.

FIG. 12 illustrates a case in which a gradation value of the 8-bit video data (input data) set from 0 to 255 for a predetermined pixel of a frame input at a predetermined time interval (for example, 1 ms) is input from imaging unit 11 to modulator 12 while changing, as an operation example of video display system 1 according to the modification example of the second exemplary embodiment.

Here, quantizer 41 performs non-linear quantization, thereby, converting the gradation value of the 8-bit video data into 4-bit video data configured by gradation values of −5 to 5 and sequentially outputting the converted data. In FIG. 12, for example, in the frame No. 1, a gradation value 10 of the video data is input, and a difference value 10 (that is, a value calculated by difference calculator 44) based on a difference (that is, the output value from integrator 43) between a gradation value 10 of the video data and the integral value 0 (the output value from integrator 44) in the frame No. 1 is input to quantizer 41. Therefore, when the difference value is positive, quantizer 41 outputs a logarithm (however, when a numerical value less than 1 is generated, the numerical value is rounded down (the same applies hereinafter)) of the difference value with a base of 2, and when the difference value is negative, quantizer 41 outputs a value obtained by multiplying a logarithm (however, when a numerical value less than 1 is generated, the numerical value is rounded down (the same applies hereinafter)) of an absolute value of the difference value with the base of 2 by −1, and when the difference value is 0, quantizer 41 outputs 0 (the same applies hereinafter). Thereby, in the frame No. 1, the output value from imaging device 2 (that is, the output value from quantizer 41) becomes 3. Here, assuming that the output value from quantizer 41 is "Q", when Q is greater than or equal to 0, inverse quantizer 50 performs inverse quantization by raising 2 to the Qth power, and when Q is negative, inverse quantizer 50 performs the inverse quantization by raising 2 to the −Qth power (the same applies hereinafter). Thereby, in the frame No. 1, the output value from inverse quantizer 50 becomes 8 (2 to the third power). Further, in high-speed display apparatus 3 that receives the output value from imaging device 2 relating to 1, the inverse quantization value 8 is calculated by inverse quantizer 61 in the same manner as inverse quantizer 50. Furthermore, high-speed display apparatus 3 sets the inverse quantization value 8 for display of a target pixel by adding the inverse quantization value 8 to the initial luminance value 0 (see frame No. 0).

In a subsequent frame No. 2, a gradation value 17 of the video data is input, and a difference value 9 based on a difference between the gradation value 17 of the video data and an integral value 8 (the sum of an integral value 0 of the frame No. 1 and the inverse quantization value 8) in the frame No. 2 is input to quantizer 41. Thereby, in the frame No. 2, the output value from imaging device 2 (quantizer 41) becomes 3. Further, in the frame No. 2, the output value from inverse quantizer 50 becomes 8. Furthermore, regarding the frame No. 2, high-speed display apparatus 3 sets the luminance value 16 for the display of the target pixel by adding the inverse quantization value 8 to the luminance value 8 (integral value) in the frame No. 1.

In a subsequent frame No. 3, a gradation value 28 of the video data is input, and a difference value 12 based on a difference between the gradation value 28 of this video data and the integral value 16 (the sum of the integral value 8 of the frame No. 2 and the inverse quantization value 8) in the frame No. 3 is input to quantizer 41. Thereby, in the frame No. 3, the output value from imaging device 2 (quantizer 41) becomes 3. Further, in the frame No. 3, the output value from inverse quantizer 50 becomes 8. Furthermore, regarding the frame No. 3, high-speed display apparatus 3 sets a luminance value 24 for the display of the target pixel by adding the inverse quantization value 8 to the luminance value 16 up to the frame No. 2. Even in the frames after the frame No. 4, the integral value, the difference, the output value from imaging device 2, and the luminance value of high-speed display apparatus 3 are respectively set based on the gradation value of the video data to be input in the same manner as described above.

As such, video display system 1 according to the modification example of the second exemplary embodiment is configured to reduce the gradation of the video data input from imaging unit 11 to modulator 12 by quantization and to reflect the information excluded by the quantization in the subsequent frame like video display system 1 according to the first exemplary embodiment described above. Therefore, when transmitting a video having a relatively high frame rate, it is possible to suppress an increase in the amount of transmission and the amount of calculation of the video while suppressing a decrease in quality of the display video of high-speed display apparatus 3 (that is, while recovering a visual gradation by matching the gradation value of the video data with the luminance value of high-speed display apparatus 3 well, as illustrated in FIG. 13). Particularly, since video display system 1 according to the modification example of the second exemplary embodiment performs non-linear quantization, when variation of the video data input from imaging unit 11 to modulator 12 is relatively large (when the video data has a high frequency), there is an advantage that smooth processing can be performed as compared with a case in which the above-described linear quantization is performed.

Also in video display system 1 according to the modification example of the second exemplary embodiment, as in the case of the second exemplary embodiment described above, in high-speed display apparatus 3, when a plurality of frames continuous in time series are displayed based on video data from imaging device 2, although a gradation value (first gradation value) of a predetermined pixel included in video data of the first gradation (for example, 8 bits) of imaging unit 11 corresponding to the plurality of frames does not change, a gradation value (second gradation value) of a predetermined pixel included in video data of the second gradation (for example, 4 bits) from imaging device 2 corresponding to the plurality of frames varies. Further, the amount of variation in the gradation value of the predetermined pixel included in the video data of the second gradation from imaging device 2 correlates information (a gradation value component smaller than the second gradation) of lower bit (here, lower 4 bits) rounded down by processing of quantizer 41.

Third Exemplary Embodiment

Figure 14:
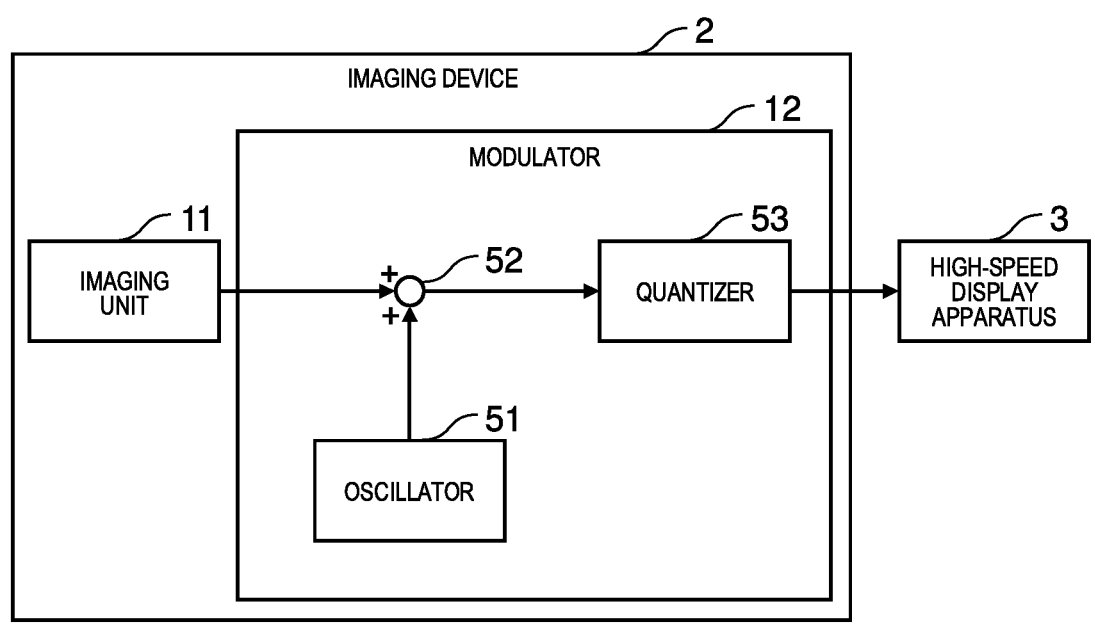
FIG. 14 is an entire configuration diagram of a video display system according to a third exemplary embodiment.

FIG. 14 is an entire configuration diagram of video display system 1 according to a third exemplary embodiment of the present disclosure. In FIG. 14, configurations corresponding to the configurations of video display system 1 illustrated in FIG. 1 are denoted by the same reference numerals. Regarding the third exemplary embodiment, items that are not described in particular below are the same as the items of video display system 1 according to the first exemplary embodiment described above, and thus, detailed description thereof will be omitted.

In modulator 12 of high-speed display apparatus 3 according to the third exemplary embodiment, oscillator 51 sequentially generates variation value data, statistically or stochastically, having a smaller bit number (for example, 4 bits) than the bit number of the video data of the first gradation input from imaging unit 11, and outputs the variation value data to adder 52. The variation value data can be generated by using, for example, a random number or a triangular wave.

Adder 52 generates data by adding 8-bit video data and the variation value data for the current frame sequentially input from imaging unit 11 and outputs the data to quantizer 53.

Quantizer 53 can generate data (quantized data) of which gradation is reduced by quantizing the data output from adder 52 into video data of the second gradation (for example, 4 bits), like quantizer 21 described above.

FIGS. 15 and 16 are explanatory diagrams illustrating first and second operation examples of the video display system 1 according to the third exemplary embodiment, respectively.

FIG. 15 illustrates a case in which each gradation value of 8-bit video data (input data) set from 0 to 240 is input from imaging unit 11 to modulator 12 at a predetermined time interval (for example, 1 ms), as the first operation example of video display system 1 according to the third exemplary embodiment. At this time, oscillator 51 sequentially generates variation values 0 to 15 (variation value data) by using a triangular wave, and thereby, adder 52 generates data by adding the 8-bit video data to the variation values and outputs the added data to quantizer 53. Further, quantizer 53 converts the gradation values of the 8-bit video data from adder 52 into 4-bit video data configured by gradation values of 0 to 15 and sequentially outputs the video data.

For the variation value 0, an 8-bit gradation value 240 is converted into a 4-bit gradation value 15 (however, is rounded down when a numerical value less than 1 is generated (the same applied hereinafter)) obtained by dividing a value obtained by adding the variation value 0 thereto by 16, and an 8-bit gradation value 239 is converted into a 4-bit gradation value 14 obtained by dividing a value obtained by adding the variation value 0 thereto by 16, and an 8-bit gradation value is converted into a 4-bit gradation value even after that in the same manner as described above. Further, for the variation value 1, the 8-bit gradation value (luminance value of a video) 240 of the video data is converted into a 4-bit gradation value 15 obtained by dividing a value obtained by adding the variation value 1 thereto by 16, and an 8-bit gradation value 239 is converted into a 4-bit gradation value 15 obtained by dividing a value obtained by adding the variation value 1 thereto by 16, and the 8-bit gradation value is converted into the 4-bit gradation value even after that in the same manner as described above.

Further, for variation values 2 to 15, an 8-bit gradation value of the video data is converted into a 4-bit gradation value 15 in the same manner as described above.

FIG. 16 illustrates a case in which each gradation value of 8-bit video data (input data) set from 0 to 240 is input from imaging unit 11 to modulator 12 at a predetermined time interval (for example, 1 ms), as the second operation example of video display system 1 according to a third exemplary embodiment. At this time, oscillator 51 sequentially generates variation values 0 to 15 (variation value data) using random numbers, and thereby, adder 52 generates data obtained by adding the 8-bit video data and the variation values and outputs the data to quantizer 53. Further, quantizer 53 converts the gradation values of the 8-bit video data from adder 52 into 4-bit video data configured by gradation values of 0 to 15 and sequentially outputs the video data.

For the variation value 0, an 8-bit gradation value 240 is converted into a 4-bit gradation value 15 (however, is rounded down when a numerical value less than 1 is generated (the same applied hereinafter)) obtained by dividing a value obtained by adding the variation value 0 thereto by 16, and an 8-bit gradation value 239 is converted into a 4-bit gradation value 14 obtained by dividing a value obtained by adding the variation value 0 thereto by 16, and an 8-bit gradation value is converted into a 4-bit gradation value even after that in the same manner as described above. Further, for the variation value 15, an 8-bit gradation value (luminance value of a video) 240 of the video data is converted into a 4-bit gradation value 15 obtained by dividing a value obtained by adding the variation value 15 thereto by 16, and the 8-bit gradation value 239 is converted into the 4-bit gradation value 15 obtained by dividing a value obtained by adding the variation value 15 thereto by 16, and the 8-bit gradation value is converted into the 4-bit gradation value even after that in the same manner as described above. Further, the 8-bit gradation value of the video data is converted into the 4-bit gradation value even for other variation values in the same manner as described above.

Here, it is assumed that the 8-bit gradation value is referred to as an "original gradation value", and the 4-bit gradation value is referred to as a "variation gradation value". For example, when an original gradation value 101 is output in a certain frame, a variation gradation value 6 is output 11 times and a variation gradation value 7 is output five times. That is, 101=6×11+7×5, and although the 4-bit gradation is output, it is possible to make it look as if the 8-bit gradation is displayed by varying the variable gradation value as needed within 16 frames.

With this configuration, video display system 1 according to the third exemplary embodiment is configured to reduce the gradation of the video data input from imaging unit 11 to modulator 12 by quantization and to reflect the information excluded by the quantization as the variation value data to be replaced, and thus, when a video having a relatively high frame rate is transmitted, it is possible to suppress an increase in the amount of transmission and the amount of calculation of a video while suppressing a decrease in quality of the displayed video in high-speed display apparatus 3.

Also in video display system 1 according to the third exemplary embodiment, as in the case of the first exemplary embodiment described above, in high-speed display apparatus 3, when a plurality of frames continuous in time series are displayed based on video data from imaging device 2, although a gradation value (first gradation value) of a predetermined pixel included in video data of the first gradation (for example, 8 bits) of imaging unit 11 corresponding to the plurality of frames does not change, a gradation value (second gradation value) of a predetermined pixel included in video data of the second gradation (for example, 4 bits) from imaging device 2 corresponding to the plurality of frames varies.

As described above, although the present disclosure is described based on the specific exemplary embodiments, the exemplary embodiments are merely examples, and the present disclosure is not limited to the exemplary embodiments.

Each configuration element of the video display system and the video display method according to the present disclosure described in the above exemplary embodiments is not necessarily indispensable and can be appropriately selected without departing from at least the scope of the present disclosure.

INDUSTRIAL APPLICABILITY

A video display system and a video display method according to the present disclosure can suppress a decrease in quality of a displayed video and suppress an increases in the amount of transmission and the amount of calculation of a video while maintaining low-delay transmission utilizing a high frame rate, when a video (a video having a frame rate exceeding 60 fps) having a relatively high frame rate is transmitted from an imaging device to a display apparatus, and are useful as a video display system and a video display method suitable for displaying a video having a relatively high frame rate.

REFERENCE MARKS IN THE DRAWINGS

1 VIDEO DISPLAY SYSTEM
2 IMAGING DEVICE
3 HIGH-SPEED DISPLAY APPARATUS
11 IMAGING UNIT
12 MODULATOR
21 QUANTIZER
22 FIRST FRAME MEMORY
23 DIFFERENCE CALCULATOR
24 INTEGRATOR
25 SECOND FRAME MEMORY
31 HIGH-SPEED DISPLAY DEVICE
32 HIGH-SPEED VIDEO INPUT UNIT
33 NORMAL VIDEO INPUT UNIT
34 DISPLAY CONTROLLER
35 SWITCH
41 QUANTIZER
42 FIRST FRAME MEMORY
43 INTEGRATOR
44 DIFFERENCE CALCULATOR
45 SECOND FRAME MEMORY
46 INTEGRATOR
50 INVERSE QUANTIZER
51 OSCILLATOR
52 ADDER
53 QUANTIZER
61 INVERSE QUANTIZER

The invention claimed is:

1. A video display system comprising:
an imaging device that sequentially generates captured video data of a first gradation having a first bit number by imaging and sequentially outputs display video data of a second gradation having a second bit number smaller than the first bit number, based on the captured video data; and
a display apparatus that sequentially displays a video based on the display video data from the imaging device,
wherein, in the display apparatus, when a plurality of frames continuous in time series are displayed based on the display video data, although a first gradation value based on the first gradation of a predetermined pixel included in the captured video data corresponding to the plurality of frames does not change in the imaging device, a second gradation value based on the second gradation of the predetermined pixel included in the display video data corresponding to the plurality of frames varies.

2. The video display system of claim 1,
wherein the imaging device includes a camera that generates the captured video data and a modulator that generates the display video data by quantizing the captured video data, and
wherein an amount of variation of the second gradation value in the display apparatus correlates with a gradation value component smaller than the second gradation generated by the quantization of the modulator.

3. The video display system of claim 1, wherein the display apparatus includes
a display that displays a video,
a first video input interface that receives the display video data from the imaging device at a frame rate exceeding 60 fps,
a second video input interface that receives external video data from an external apparatus different from the imaging device at a frame rate of 60 fps or less, and
a switch that selectively inputs the display video data from the first video input interface and the external video data from the second video input interface to the display device.

4. The video display system of claim 2, wherein the modulator includes
a quantizer that sequentially outputs quantized data obtained by quantizing input data based on the captured video data into the display video data,
a storage that sequentially stores the quantized data output from the quantizer,
a difference calculator that sequentially calculates differences between the captured video data of the first gradation for a current frame and the quantized data for a previous frame stored in the storage, and
an integrator that sequentially outputs integral data obtained by sequentially integrating the differences output from the difference calculator as the input data of the quantizer.

5. The video display system of claim 2, wherein the modulator includes
a quantizer that sequentially outputs quantized data obtained by quantizing input data based on the captured video data into the display video data,
a storage that sequentially stores the quantized data output from the quantizer,
an integrator that sequentially outputs integral data obtained by sequentially integrating the quantized data stored in the storage, and
a difference calculator that sequentially calculates differences between the captured video data of the first gradation and the integral data and sequentially outputs the calculated differences as the input data of the quantizer.

6. The video display system of claim 2, wherein the modulator includes
an oscillator that sequentially generates variation value data having the second bit number statistically or stochastically,
an adder that sequentially adds the variation value data to the captured video data of the first gradation, and
a quantizer that sequentially outputs quantized data obtained by quantizing data output from the adder into the display video data of the second gradation.

7. A video display method performed by a video display system including an imaging device that sequentially generates captured video data of a first gradation having a first bit number by imaging and sequentially outputs display video data of a second gradation having a second bit number smaller than the first bit number, based on the captured video data, and a display apparatus that sequentially displays a video based on the display video data from the imaging device, the method comprising:

varying a second gradation value based on the second gradation of a predetermined pixel included in the display video data corresponding to a plurality of frames, in the display apparatus, when the plurality of frames continuous in time series are displayed based on the display video data, although a first gradation value based on the first gradation of the predetermined pixel included in the captured video data corresponding to the plurality of frames does not change in the imaging device.

8. The video display system according to claim 1, wherein the imaging device, including a camera, sequentially generates the captured vide data, and sequentially outputs the display video data by quantizing the sequentially generated captured video data, wherein an amount of variation of the second gradation value in the display apparatus correlates with a gradation value component smaller than the second gradation generated by the quantization.

9. The video display system according to claim 1, wherein the imaging device performs operations including:

sequentially outputting quantized data obtained by quantizing input data based on the captured video data into the display video data, sequentially storing the output quantized data into a storage, sequentially calculating differences between the captured video data of the first gradation for a current frame and the quantized data for a previous frame stored in the storage, and sequentially outputting integral data obtained by sequentially integrating the differences as the input data for quantizing.

10. The video display system according to claim 1, wherein the imaging device performs operations including:

sequentially outputting quantized data obtained by quantizing input data based on the captured video data into the display video data, sequentially storing the output quantized data into a storage, sequentially outputting integral data obtained by sequentially integrating the quantized data stored in the storage, and sequentially calculating differences between the captured video data of the first gradation and the integral data and sequentially outputting the calculated differences as the input data for quantizing.

11. The video display system according to claim 1, wherein the imaging device performs operations including:

sequentially generating variation value data having the second bit number statistically or stochastically, sequentially adding the variation value data to the captured video data of the first gradation, and sequentially outputting quantized data obtained by quantizing data obtained by adding the variation value data to the captured video data into the display video data of the second gradation.

12. A video display method comprising:

sequentially generating captured video data of a first gradation having a first bit number sequentially inputted from an imaging element and sequentially outputting display video data of a second gradation having a second bit number smaller than the first bit number, based on the captured video data, varying a second gradation value based on the second gradation of a predetermined pixel included in the display video data corresponding to a plurality of frames, when the plurality of frames continuous in time series are outputted to a display device based on the display video data, although a first gradation value based on the first gradation of the predetermined pixel included in the captured video data corresponding to the plurality of frames does not change.

* * * * *